United States Patent [19]
Van Bemmel et al.

[11] Patent Number: 5,999,885
[45] Date of Patent: Dec. 7, 1999

[54] METHOD AND APPARATUS FOR AUTOMATICALLY IDENTIFYING FAULT CUTS IN SEISMIC DATA USING A HORIZON TIME STRUCTURE

[75] Inventors: Peter P. Van Bemmel, Houston; Randolph E. F. Pepper, Sugar Land; William G. Dillon, Missouri City, all of Tex.

[73] Assignee: GeoQuest, Houston, Tex.

[21] Appl. No.: 08/796,233

[22] Filed: Feb. 6, 1997

Related U.S. Application Data

[60] Provisional application No. 60/026,705, Sep. 25, 1996.
[51] Int. Cl.$^6$ ........................................................ G01V 1/40
[52] U.S. Cl. ................................ 702/14; 324/323; 367/14
[58] Field of Search ................................. 702/1, 2, 5, 11, 702/14; 324/323, 329, 336, 337; 367/14, 21, 23, 27, 28, 31

[56] References Cited

U.S. PATENT DOCUMENTS

| | | | |
|---|---|---|---|
| 4,355,379 | 10/1982 | Sherwood | 367/68 |
| 5,537,320 | 7/1996 | Simpson et al. | 702/14 |

FOREIGN PATENT DOCUMENTS

WO 96/13788   5/1996   WIPO .

*Primary Examiner*—Thomas Peeso
*Attorney, Agent, or Firm*—John H. Bouchard

[57] ABSTRACT

An interpretation workstation based apparatus having an "Auto Fault" software stored therein automatically identifies a plurality of fault cuts in each of a plurality of horizons in a seismic data volume in response to a plurality of predetermined "horizon time structures". When a processor in the workstation executes the "Auto Fault" software, the processor will receive the "horizon time structures" and perform the following steps: (a) identify valid gaps in each of the horizon time structures where each gap has a proper length and a proper slope, (b) locate midpoints in each of the valid gaps, (c) draw fault cuts at each of the midpoints of each of the valid gaps in the horizon time structure where the drawn fault cut has an inclination angle equal to a predefined and user input inclination angle for single horizon analysis, and an angle determined by association for multiple horizon analysis, and (d) extend the upper and the lower part of the horizon of the horizon time structure to the newly drawn fault cuts until a pair of fault contacts on the fault cuts are determined whereby each of the plurality of fault cuts in each of the plurality of horizons in the seismic data are automatically and rapidly determined.

25 Claims, 20 Drawing Sheets

(6 of 20 Drawing Sheet(s) Filed in Color)

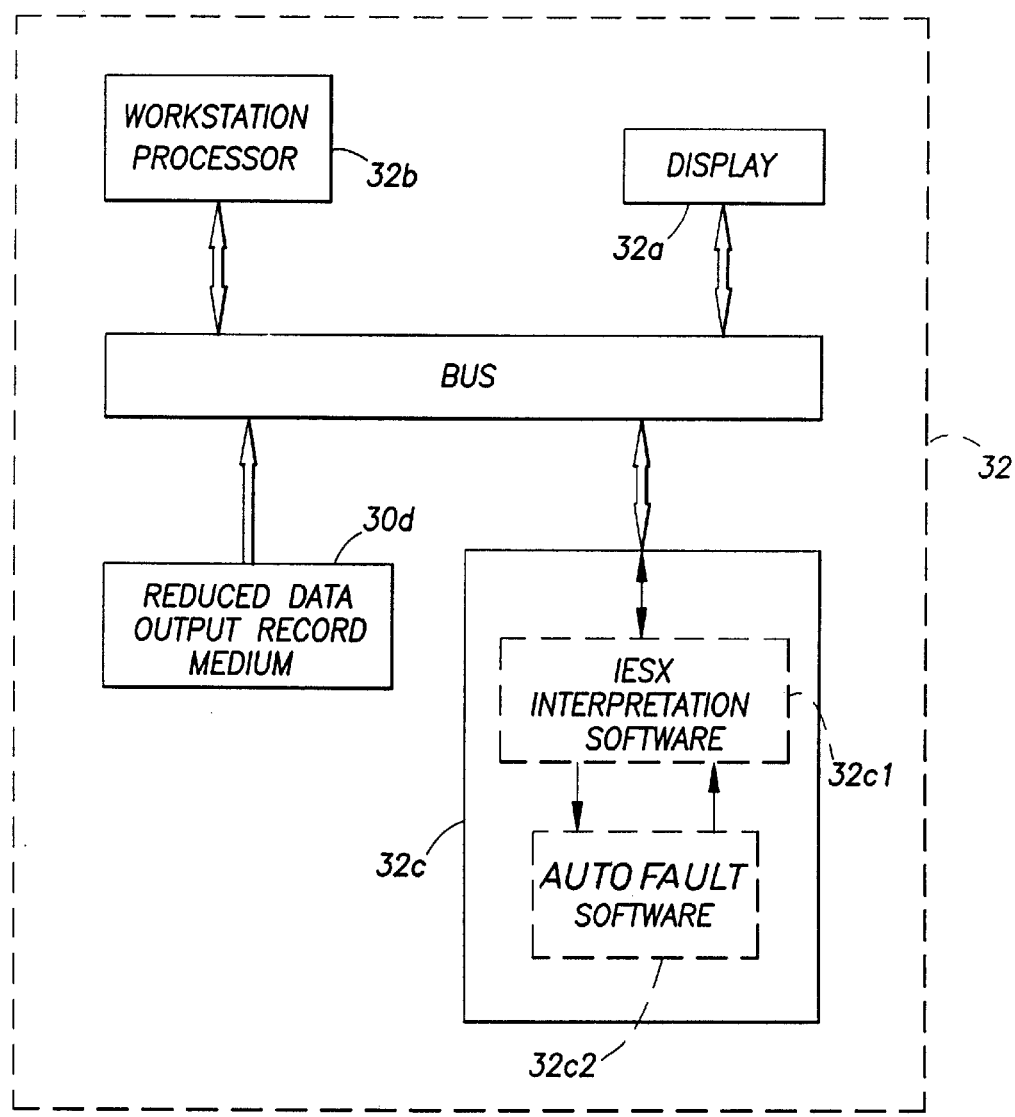

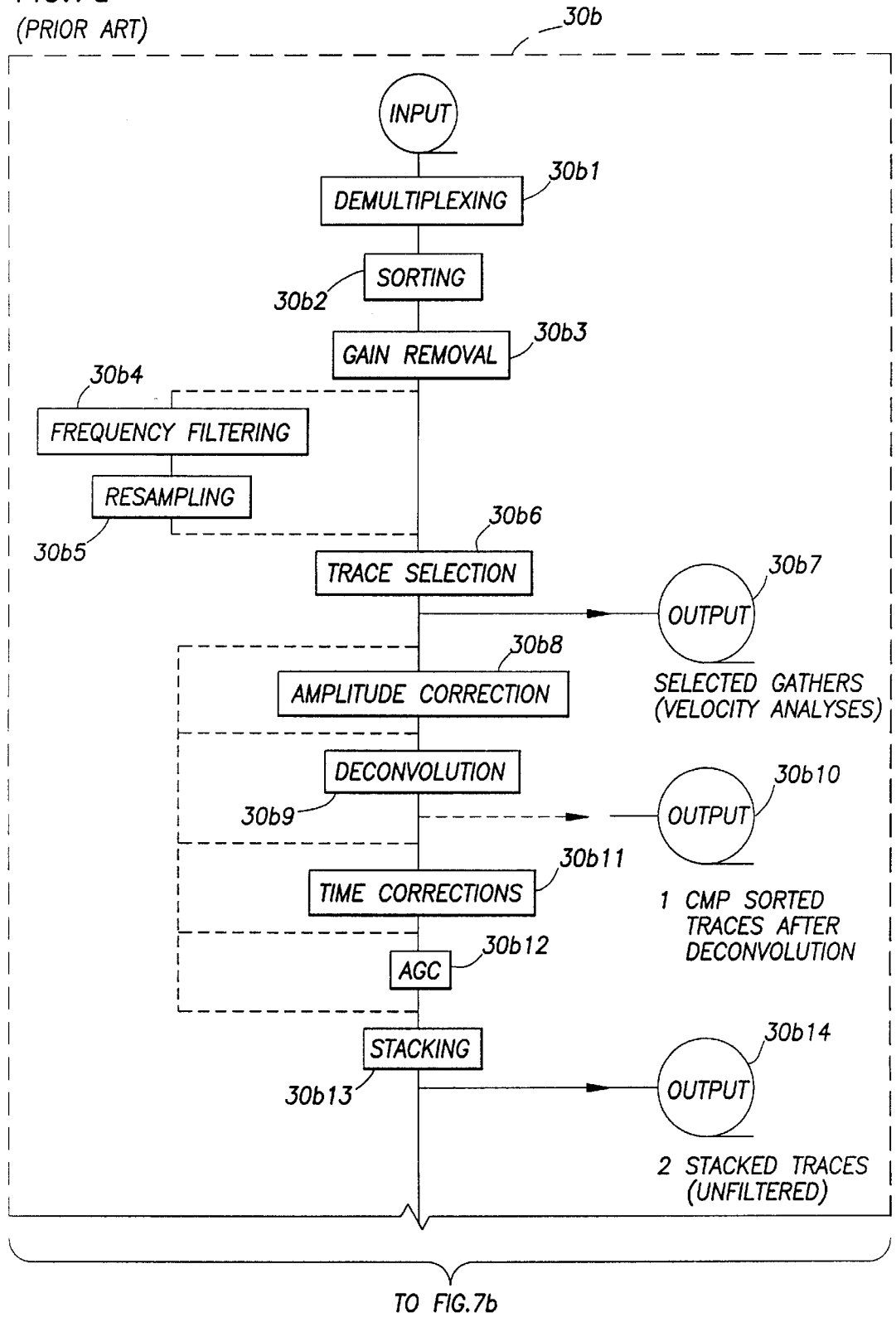

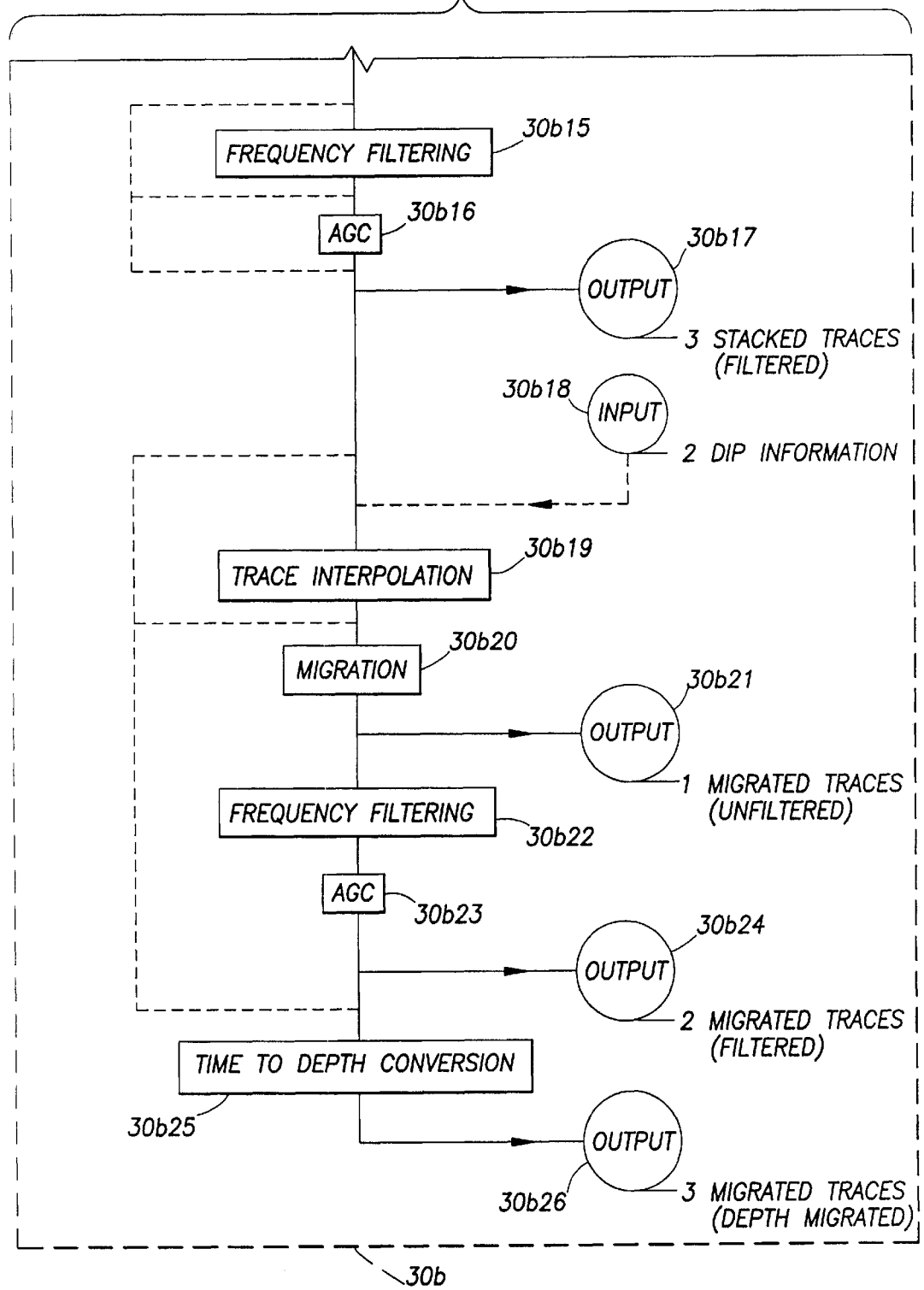

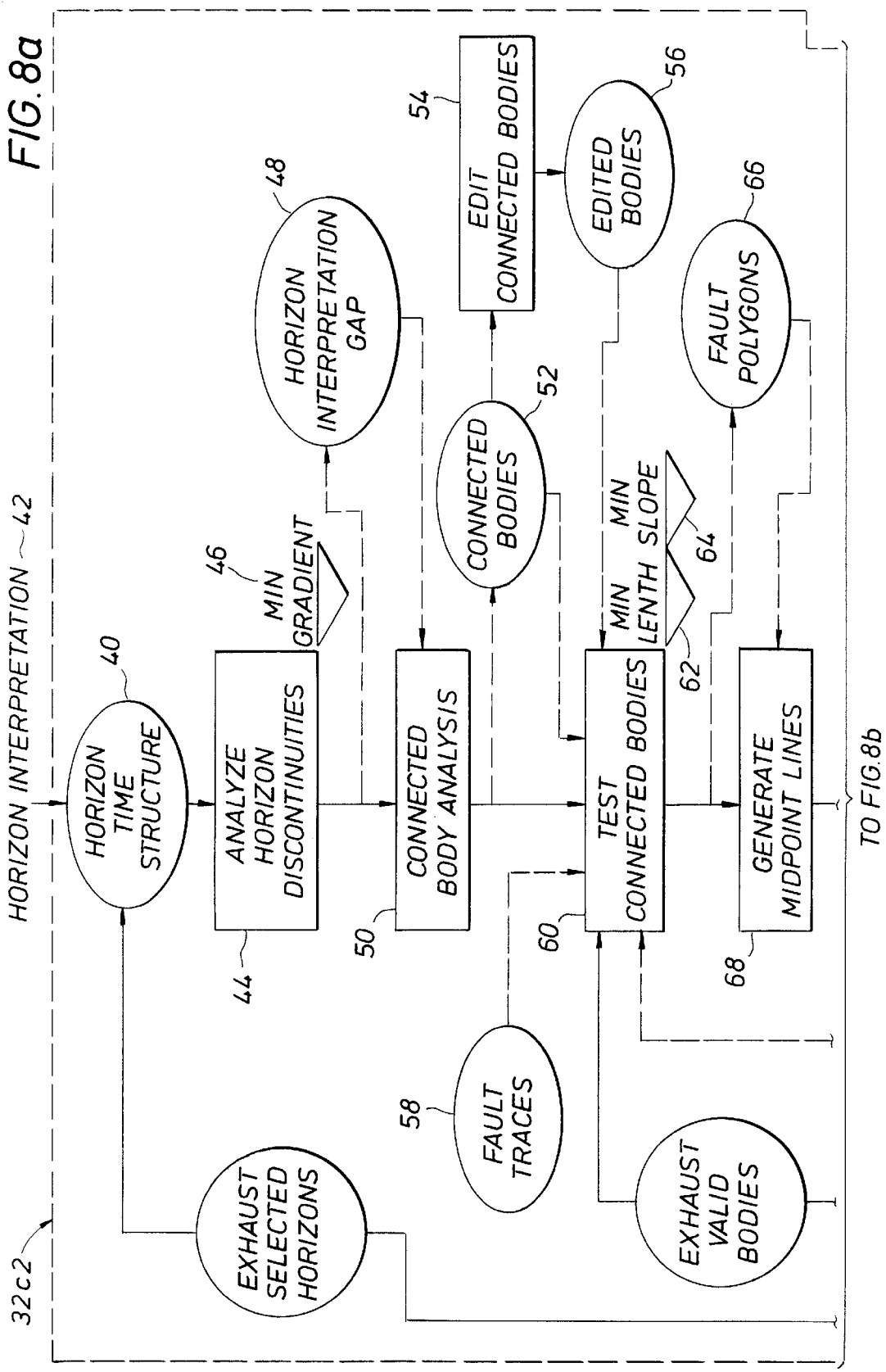

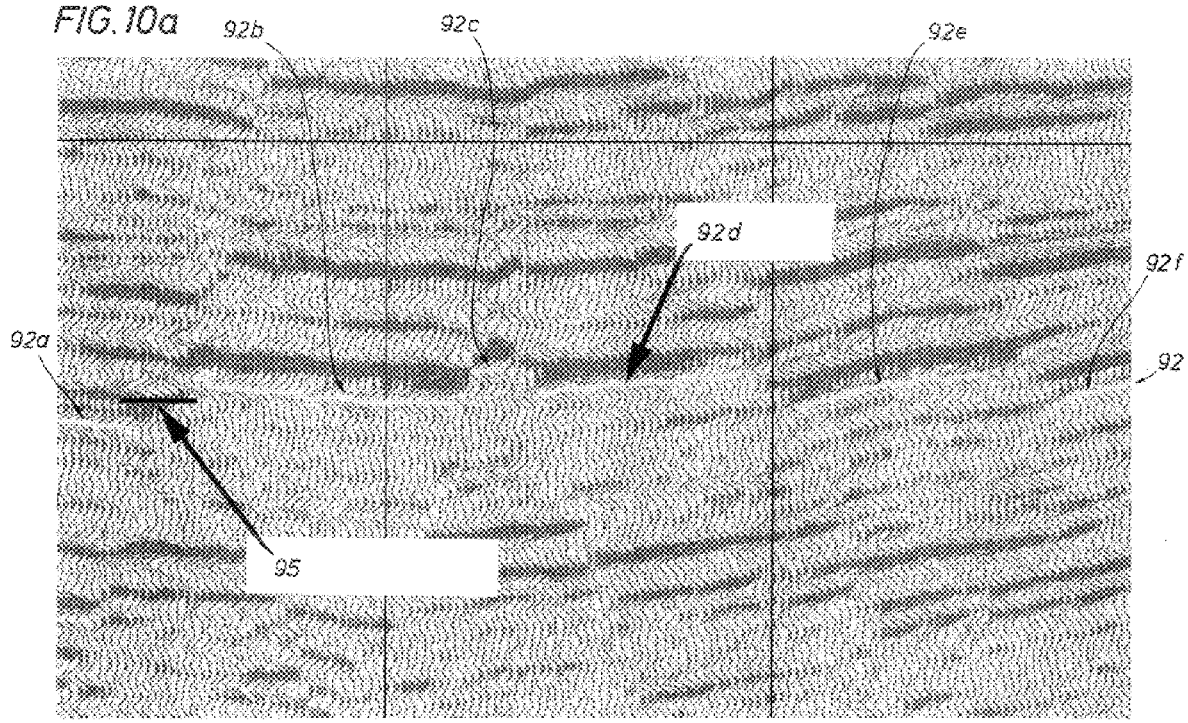

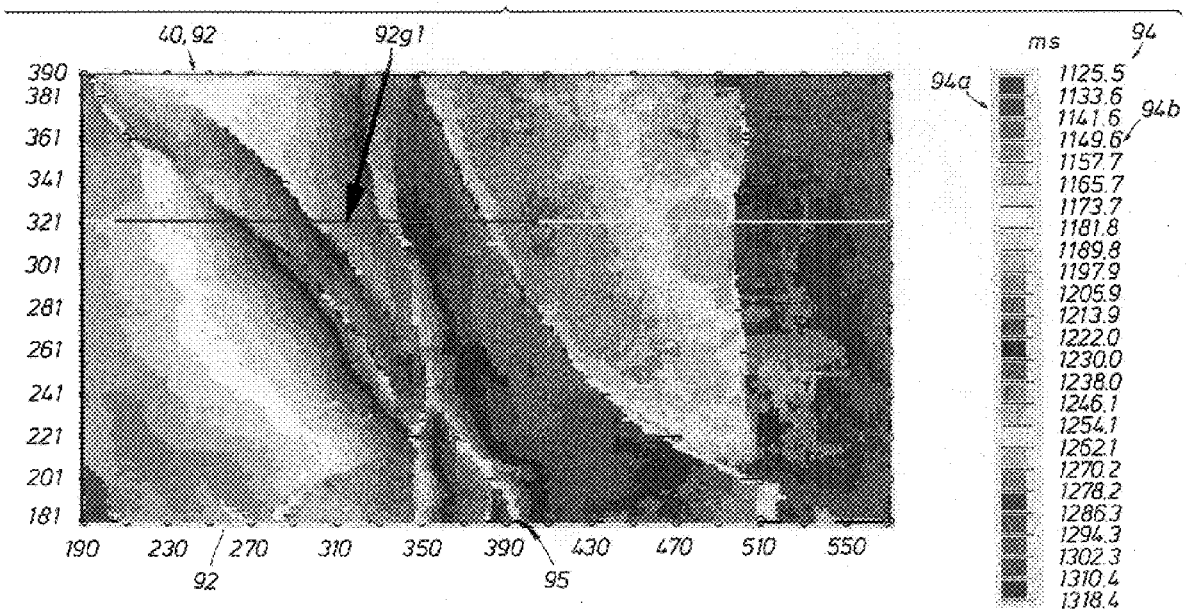

FIG. 11
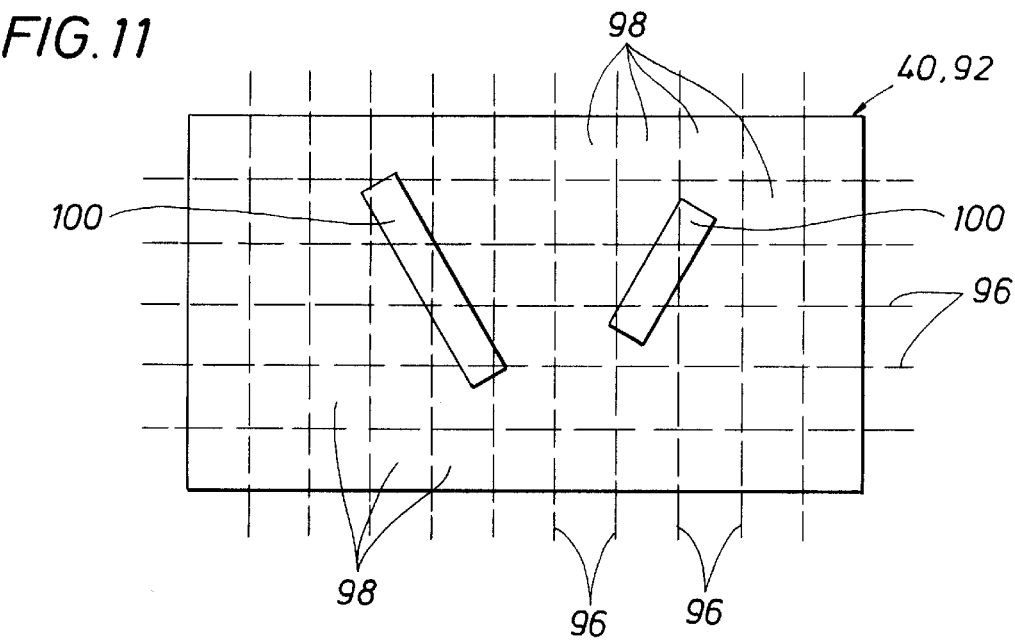
FIG. 12
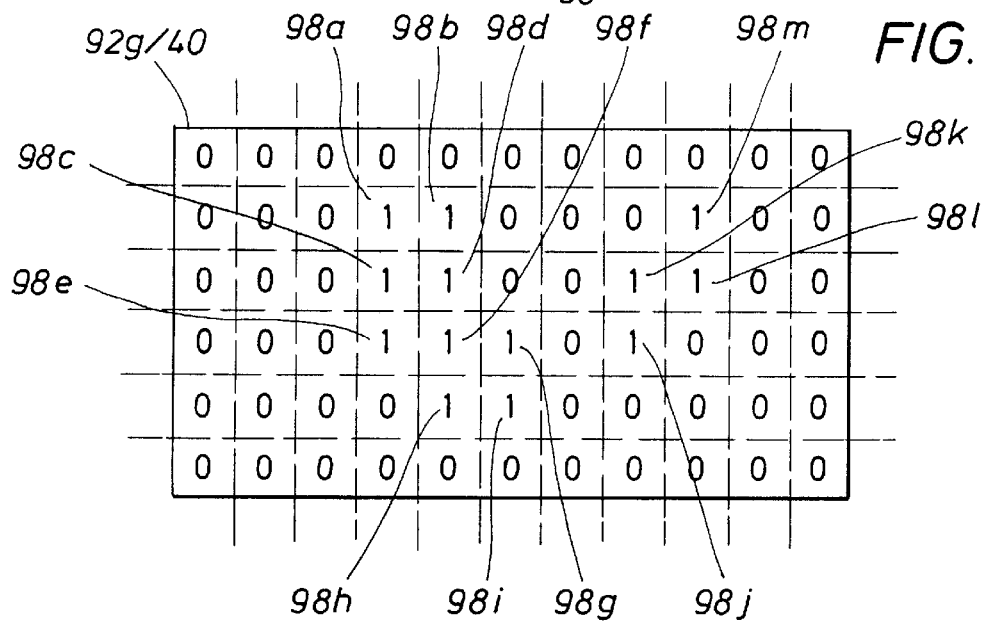
FIG. 13
| 0 | 0 | 0 | 0 | 0 | 0 | 0 | 0 | 0 | 0 | 0 |
|---|---|---|---|---|---|---|---|---|---|---|
| 0 | 0 | 0 | 1 | 1 | 0 | 0 | 0 | 1 | 0 | 0 |
| 0 | 0 | 0 | 1 | 1 | 0 | 0 | 1 | 1 | 0 | 0 |
| 0 | 0 | 0 | 1 | 1 | 1 | 0 | 1 | 0 | 0 | 0 |
| 0 | 0 | 0 | 0 | 1 | 1 | 0 | 0 | 0 | 0 | 0 |
| 0 | 0 | 0 | 0 | 0 | 0 | 0 | 0 | 0 | 0 | 0 |

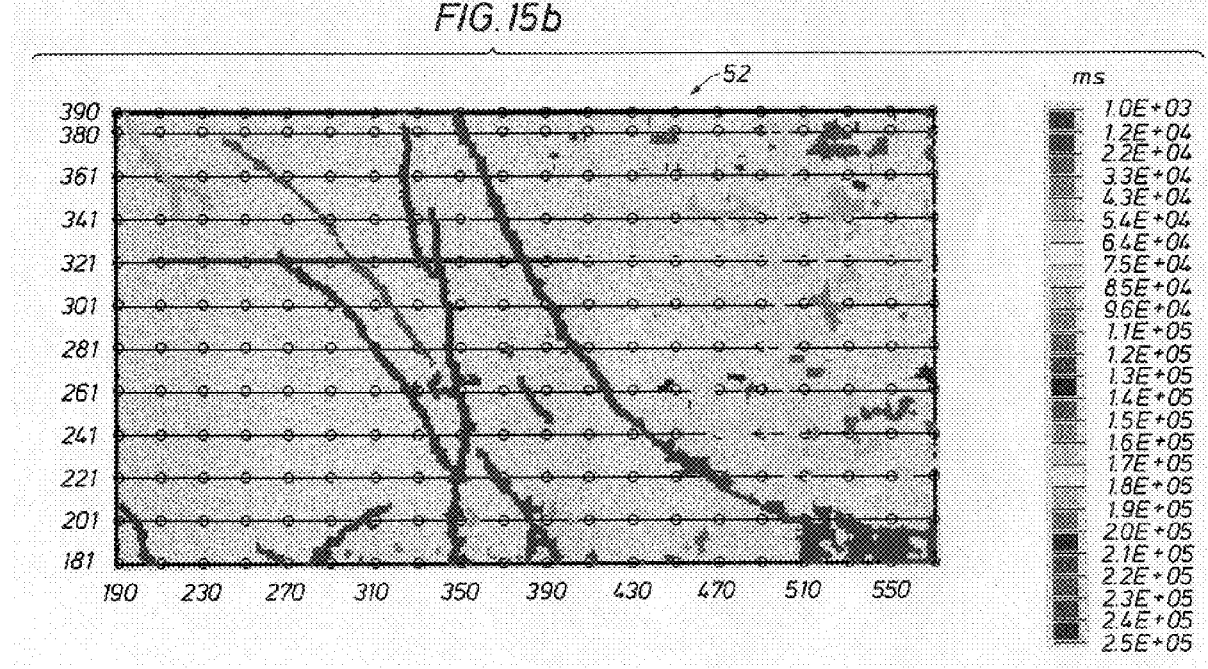

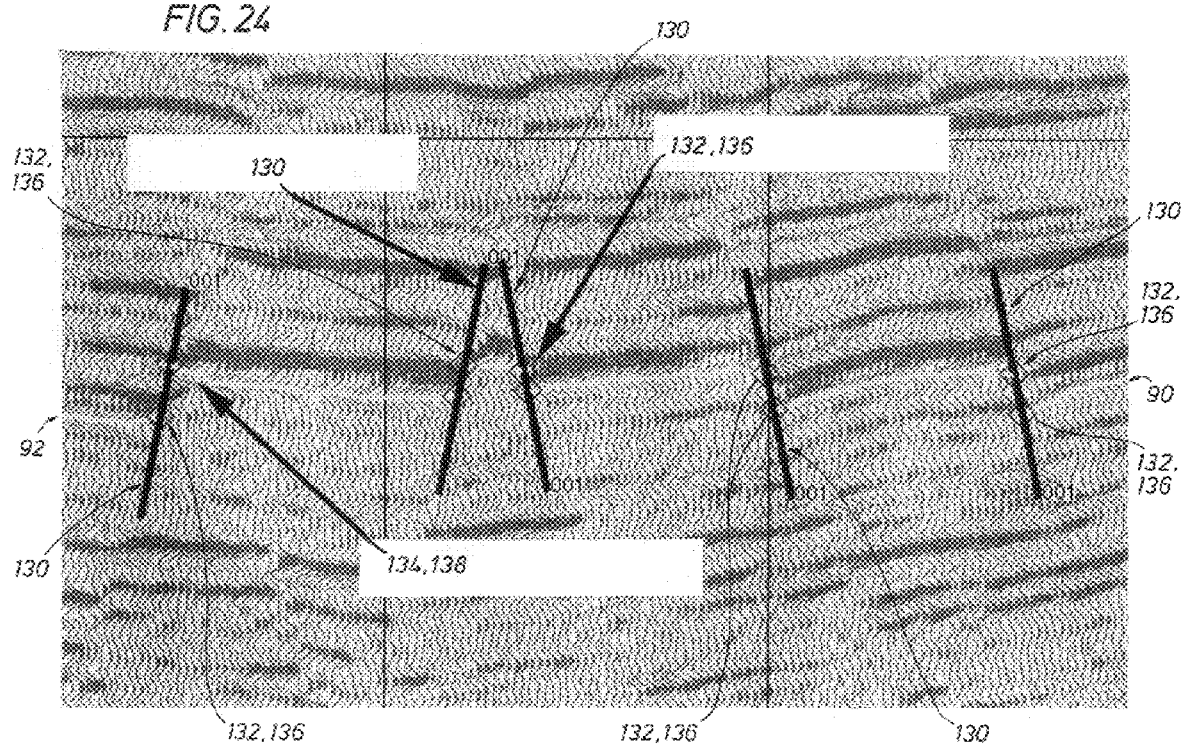

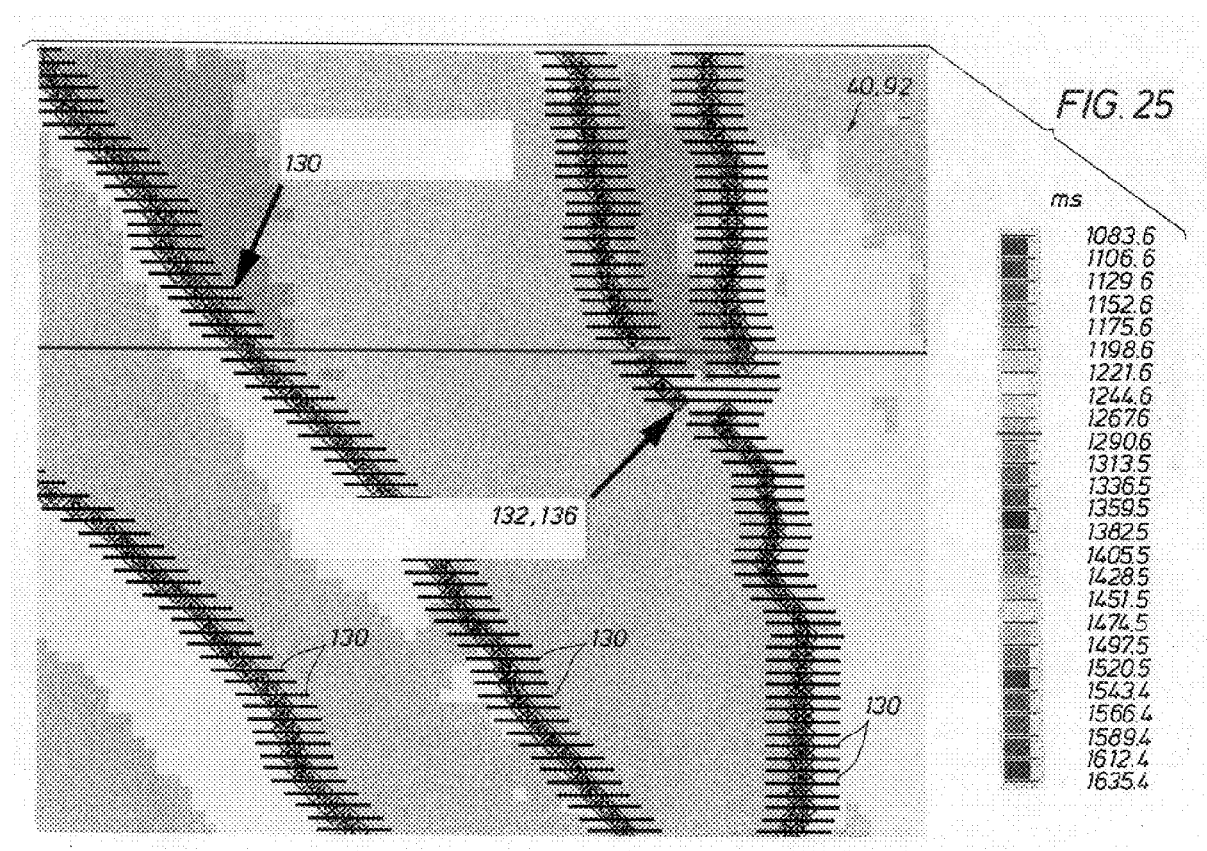

METHOD AND APPARATUS FOR AUTOMATICALLY IDENTIFYING FAULT CUTS IN SEISMIC DATA USING A HORIZON TIME STRUCTURE

CROSS REFERENCE TO RELATED APPLICATION

This specification was filed under 35 USC 119(e) (1) within one year following the filing of a corresponding Provisional Application Ser. No. 60/026,705, filed Sep. 25, 1996, and entitled "Automatic Fault Interpretation From Seismic Horizons".

BACKGROUND OF THE INVENTION

The subject matter of the present invention relates to a workstation based apparatus and associated method for automatically identifying fault curves in seismic data by using a horizon time structure, reflective of one of the horizons inherent in the seismic data, to automatically identify valid gaps in the horizon time structure having a proper length and slope, to locate midpoints in the valid gaps, to draw fault cuts at the midpoints of the gap at a user defined inclination, and to extend the horizon to the newly drawn fault cuts thereby automatically identifying the fault curves in the seismic data.

Faulting of stratigraphic subterranean formations creates hydrocarbon traps and flow channels. As a result, accurate identification of the fault curves and fault surfaces is essential to the interpretation of most seismic data volumes. Those persons involved in exploration to locate such hydrocarbon traps and flow channels in the formations use an interactive workstation on which is displayed sections of seismic data. The seismic data includes a plurality of fault curves or fault cuts, each fault cut representing the intersection of a fault surface with a horizontal "horizon" inherent in the seismic data. However, when using most existing workstation tools that include interactive computer programs, the interpretation of fault cuts on horizons in the seismic data is tedious and time consuming; that is, the workstation operator must view the seismic data volume on the workstation display, manually determine by viewing the seismic data where a plurality of horizons are located in the seismic data, and manually determine by viewing the plurality of horizons where a plurality of fault cuts are located in each of the plurality of horizons in the seismic data volume. This manual method for determining the fault cuts in the horizons on the seismic data, aside from being very tedious and time consuming, produced an inconsistent set of results in terms of accuracy because the accuracy of the results depended upon the mental awareness of the workstation operator.

Therefore, a more accurate method and apparatus adapted to be disposed in a computer workstation for identifying fault cuts in seismic data is needed for automatically determining, from an input seismic data volume that contains a plurality of horizons, where one or more fault cuts are located in each of the plurality of horizons in the seismic data.

For example, one such method and apparatus, for automatically determining where a plurality of faults are located in the plurality of horizons in seismic data, is disclosed in U.S. Pat. No. 5,537,320 to Simpson et al, the disclosure of which is incorporated by reference in this specification. In the Simpson et al patent, a seed fault is placed by a user in the seismic data, and a plurality of fault curves are determined, by a computer program executing in a workstation, in response to the seed fault placed by the user in the seismic data.

However, recalling that the seismic data includes a plurality of horizons and each of the plurality of horizons in the seismic data include a plurality of faults, while the Simpson et al patent does require the seismic data and a seed fault in the seismic data for determining the plurality of faults in the seismic data, the Simpson et al patent does not determine one or more fault cuts in a horizon (also called "a horizon time structure") from the horizon time structure itself.

SUMMARY OF THE INVENTION

Accordingly, it is a primary object of the present invention to determine one or more fault cuts in each of a plurality of horizons in a set of seismic data in response to a plurality of horizon time structures which correspond, respectively, to the plurality of horizons.

It is a further object of the present invention to determine one or more fault cuts in each of a plurality of horizons in a set of seismic data, in response to a plurality of predetermined horizon time structures which correspond, respectively, to the plurality of horizons in the seismic data, by automatically: (a) identifying valid gaps in each of the horizon time structures where each gap has a proper length and a proper slope, (b) locating midpoints in each of the valid gaps, (c) drawing fault cuts at each of the midpoints of each of the valid gaps in the horizon time structure where the drawn fault cut has an inclination angle equal to a predefined and user input inclination angle, and (d) extending the upper and the lower part of the horizon of the horizon time structure to each of the newly drawn fault cuts until a pair of fault contacts are determined thereby automatically identifying each of the plurality of fault cuts in each of the plurality of horizons in the seismic data.

It is a further object of the present invention to determine one or more fault cuts in each of a plurality of horizons in a set of seismic data, in response to a plurality of predetermined horizon time structures which correspond, respectively, to the plurality of horizons in the seismic data, wherein the previously defined step (a) of identifying valid gaps in each of the horizon time structures would include the the further step (a1) of determining a horizon interpretation gap from each of the horizon time structures and then determining a set of connected bodies from the horizon interpretation gap where the set of connected bodies include the valid gaps.

It is a further object of the present invention to determine one or more fault cuts in each of a plurality of horizons in a set of seismic data, in response to a plurality of predetermined horizon time structures which correspond, respectively, to the plurality of horizons in the seismic data, wherein the previously defined step (a) of identifying valid gaps in each of the horizon time structures, in addition to the step (a1) of determining the set of connected bodies on the horizon time structure, could further include the steps (a2) of determining a set of edited bodies representing edited versions of the set of connected bodies on the horizon time structure determined during step (a1), or, alternatively, providing one or more manually defined fault traces on the horizon time structure.

It is a further object of the present invention to determine one or more fault cuts in each of a plurality of horizons in a set of seismic data, in response to a plurality of predetermined horizon time structures which correspond, respectively, to the plurality of horizons in the seismic data, wherein the previously defined step (a) of identifying valid gaps in each of the horizon time structures, in addition to the step (a1) of determining the set of connected bodies on the horizon time structure and the steps (a2) of determining a set of edited bodies or alternatively providing one or more manually defined fault traces on the horizon time structure, could further include the step (a3) of testing to determine if the valid gaps representing fault surfaces, in the set of connected bodies or in the edited bodies or in the fault traces, each have a length greater than or equal to a predetermined minimum length and a slope greater than or equal to a predetermined minimum slope.

In accordance with these and other objects of the present invention, an interpretation workstation based apparatus, having an "Auto Fault" software stored therein, automatically identifies one or more fault cuts in each of a plurality of valid gaps in each of a plurality of horizons in a seismic data volume in response to a plurality of predetermined "horizon time structures". When a processor of the workstation executes the "Auto Fault" software, the processor will receive a plurality of predetermined "horizon time structures" where each "horizon time structure" is representative of a horizon in the seismic data, and, when the "horizon time structures" are received, the processor will perform the following steps: (a) identify valid gaps in each of the horizon time structures where each gap has a proper length and a proper slope, (b) locate midpoints in each of the valid gaps, (c) draw fault cuts at each of the midpoints of each of the valid gaps in the horizon time structure, where the drawn fault cut has an inclination angle equal to a predefined and user input inclination angle for single horizon analysis and an inclination angle determined by association for multiple horizon analysis, and (d) extend the upper and the lower part of the horizon of the horizon time structure to each of the newly drawn fault cuts until a pair of fault contacts are determined thereby automatically identifying each of the one or more fault cuts in each of the valid gaps in each of the plurality of horizons in the seismic data. The step (a) of identifying valid gaps in each of the horizon time structures, could include one or more of the following additional steps: (a1) determining a horizon interpretation gap from each of the horizon time structures and then determining a set of connected bodies from the horizon interpretation gap where the set of connected bodies include the valid gaps, (a2) determining a set of edited bodies representing edited versions of the set of the connected bodies on the horizon time structure, or alternatively providing one or more manually defined fault traces on the horizon time structure, and (a3) determining if the valid gaps representing fault surfaces, in the connected bodies and in the edited bodies and in the fault traces, each have a length greater than or equal to a predetermined minimum length and a slope greater than or equal to a predetermined minimum slope.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

The file of this patent contains at least one drawing executed in color. Copies of this patent with color drawings will be provided by the Patent and Trademark Office upon request and payment of the necessary fee.

A full understanding of the present invention will be obtained from the detailed description of the preferred embodiment presented hereinbelow, and the accompanying drawings, which are given by way of illustration only and are not intended to be limitative of the present invention, and wherein:

FIG. 5 illustrates a workstation and associated display for receiving the reduced data output record medium;

FIG. 6 illustrates in greater detail the workstation of FIG. 5 showing the memory in the workstation which stores the "Auto Fault" software in accordance with the present invention that allows the processing system of the present invention to process, analyze, and interpret the sets of seismic data for the purpose of identifying and determining one or more fault cuts in each horizon of a plurality of horizons in the sets of 3D seismic data;

FIGS. 7a and 7b illustrate a flowchart of the data reduction software of FIG. 4;

FIGS. 8a and 8b illustrates a flowchart of the "Auto Fault" software of FIG. 6;

FIG. 9b illustrates a top view of the horizon of FIG. 9a;

FIG. 10a illustrates a more realistic example of one set of 3D seismic data which includes a plurality of horizons and "one horizon in particular";

FIG. 10b illustrates a "horizon time structure" representing a top view of the "one horizon in particular" of FIG. 10a;

FIGS. 11 and 12 illustrate the functional operation of the "analyze horizon discontinuities" which is part of the "Auto Fault" software flowchart of FIGS. 8a–8b;

FIG. 13 illustrates an example of the "horizon interpretation gap" appearing as one block on the "Auto Fault" software flowchart of FIGS. 8a–8b;

FIGS. 15a and 15b illustrates an example of the "connected bodies" appearing as one block on the "Auto Fault" software flowchart of FIGS. 8a–8b;

FIGS. 24 and 25 illustrate example "fault elements" which is the last block on the "Auto Fault" software flowchart of FIGS. 8a–8b, the "fault elements" representing the "output" in accordance with the present invention that is generated when the "Auto Fault" software of FIGS. 6 and 8a–8b, of the present invention, is executed by the workstation 32 of FIG. 6.

DETAILED DESCRIPTION OF THE PREFERRED EMBODIMENT

Figure 1:
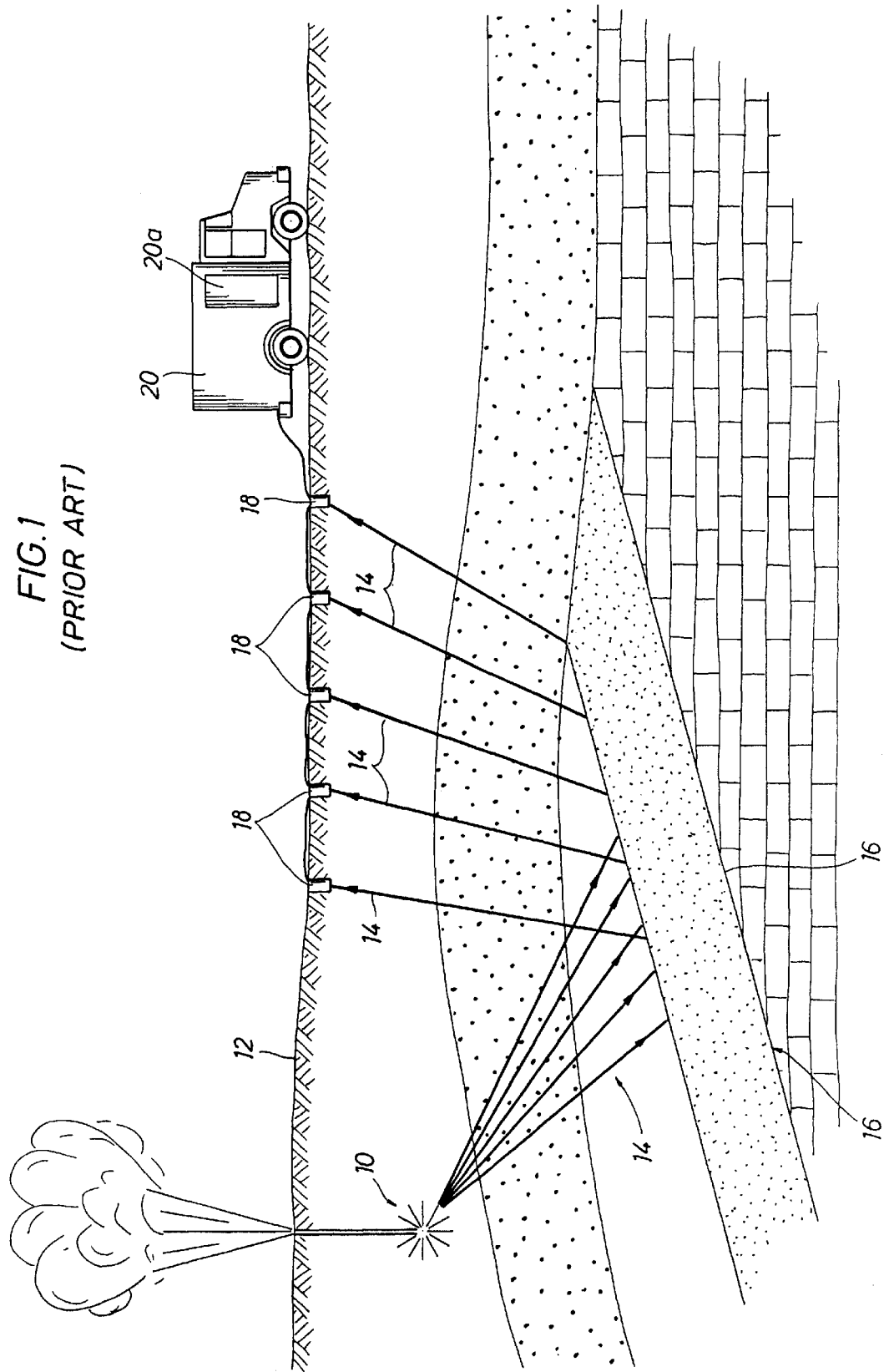
FIGS. 1 and 2 illustrate the method and apparatus needed for performing a 3D seismic operation.
Figure 2:
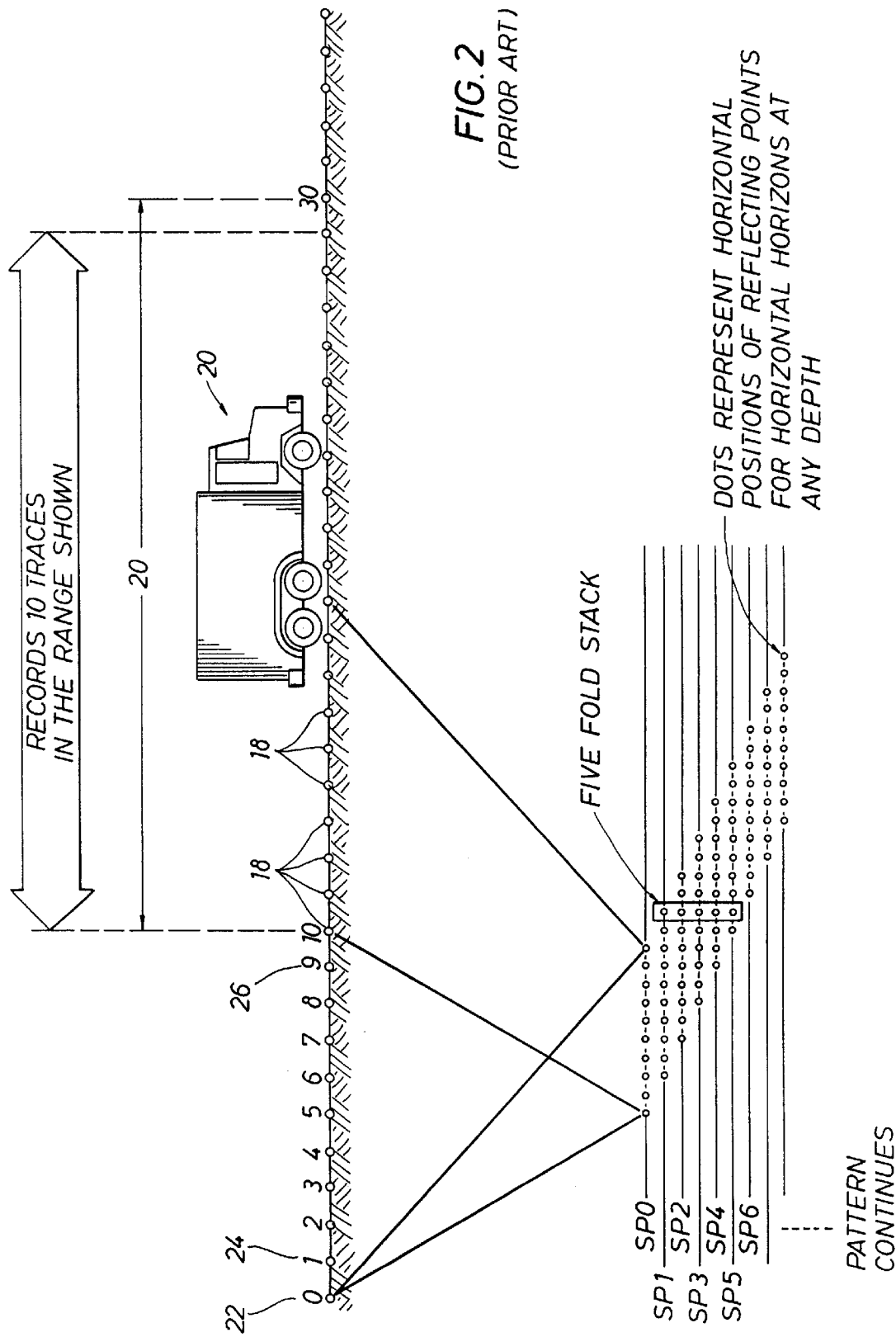

Referring to FIGS. 1 and 2, an apparatus and associated method for performing a 3D seismic operation at a location of the earth's surface is illustrated.

In FIG. 1, an explosive or acoustic energy source 10 situated below the surface of the earth 12 detonates and generates a plurality of sound vibrations 14 which propagate downwardly and reflect off a layer 16 within the earth. The layer 16 could be a rock layer or a sand or shale layer. When the sound vibrations reflect off the layer 16 in the earth, the sound vibrations 14 will propagate upwardly and will be received in a plurality of receivers 13 called geophones 18. The plurality of geophones 18 will each generate an electrical signal in response to the receipt of a sound vibration therein and a plurality of electrical signals will be generated from the geophones 18, the plurality of signals being received in a recording truck 20. The plurality of electrical signals from the geophones 18 represent a set of characteristics of the earth formation located within the earth below the geophones 18, and, in particular, the characteristics of that portion of the earth located adjacent the layer 16 in the earth. The truck 20 contains a computer 20a which will receive and store the plurality of signals received from the geophones 18. An output record medium will be generated from the computer 20a in the recording truck 20 which will include and/or display and/or store the plurality of electrical signals that are representative of the characteristics of the earth formation situated in the earth below the geophones 18. The apparatus and method described above with reference to FIG. 1 is called a 2D (for two dimensional) seismic operation because the above referenced method referred to generating the sound vibrations 14 along the x-z axes. However, in reality, the sound vibrations 14 would be propagating along the x, y, and z axes. As a result, the apparatus and method described above with reference to FIG. 1 should more properly be called a "3D" seismic operation (since the sound vibrations 14 propagate along the x, y, and z axes in FIG. 1). The x-axis represents the horizontal distance, the y-axis represents the transverse distance, and the z-axis represents the reflection time.

Referring to FIG. 2, another method and apparatus for performing a 3D seismic operation is illustrated. FIG. 2 was taken from a book entitled "Seismic Velocity Analysis and the Convolutional Model", by Enders A. Robinson, the disclosure of which is incorporated by reference into this specification.

In FIG. 2, the 3D seismic operation of FIG. 1 is performed 10 different times. For example, when the explosive or acoustic energy source 10 is located at position 22 (the first position or position "0" along the surface of the earth) in FIG. 2, a first plurality of electrical signals from the geophones 18 are stored in the computer 20a in the recording truck 20. The explosive energy source is moved to position 24. When the explosive energy source 10 is located in position 24 (the second position or position "1" along the surface of the earth), a second plurality of electrical signals are stored in the computer 20a in the recording truck 20. The explosive energy source 10 is repeatedly and sequentially moved from positions "2" to "9" in FIG. 2 until it is located at position 26 (i.e.—position "9" which is the tenth position) on the surface of the earth. When the explosive energy source 10 is located in position 26 (the tenth position along the surface of the earth), a tenth plurality of electrical signals are stored in the computer 20a in the recording truck 20. As a result, in FIG. 2, the recording truck 20 records a "set of 3D seismic data" which consists of the 10 traces or ten sets of electrical signals, where each set of electrical signals comprises a plurality of electrical signals that originated from subsurface locations situated between position 22 and position 26 along the surface of the earth. An output record medium will be generated by the computer 20a in the recording truck 20 which includes the "set of 3D seismic data" received from the geophones 18. The method and apparatus described above with reference to FIGS. 1 and 2 represent a "3D seismic operation".

Figure 3:
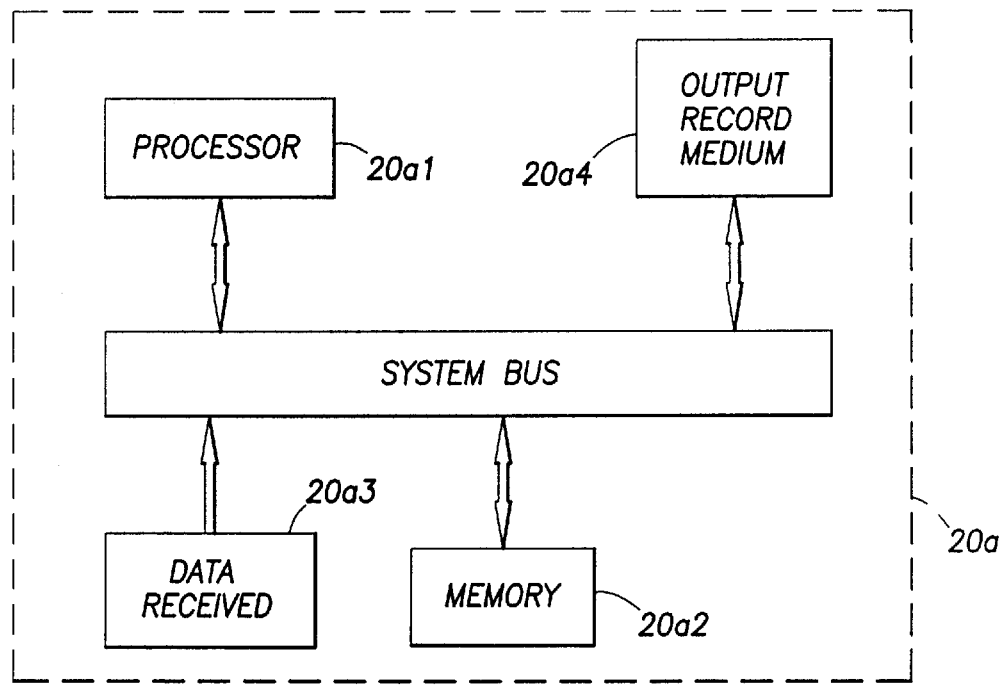
FIG. 3 illustrates a simplified diagram of the processing system present in the recording truck used during a 3D seismic operation for collecting sets of 3D seismic data obtained during the 3D seismic operation of FIGS. 1 and 2 and for storing the sets of 3D seismic data on an output record medium, such as a magnetic tape.

Referring to FIG. 3, a more detailed construction of the recording truck computer 20a is illustrated. The recording truck computer 20a includes a processor 20a1 and a memory 20a2 connected to a system bus. The set of 3D seismic data (the ten traces or ten sets of electrical signals, received from the geophones 18 of FIGS. 1 and 2 and generated by the geophones 18 during the 3D seismic operation) would be received into the recording truck computer 20a, via the "Data received" block 20a3 in FIG. 3 connected to the system bus, and stored in the memory 20a2 of the recording truck computer 20a. When desired, an output record medium 20a4, also connected to the system bus, is generated which will include, store, and/or display the set of 3D seismic data; and, more particularly, the ten traces or ten sets of electrical signals received from the geophones 18.

Figure 4:
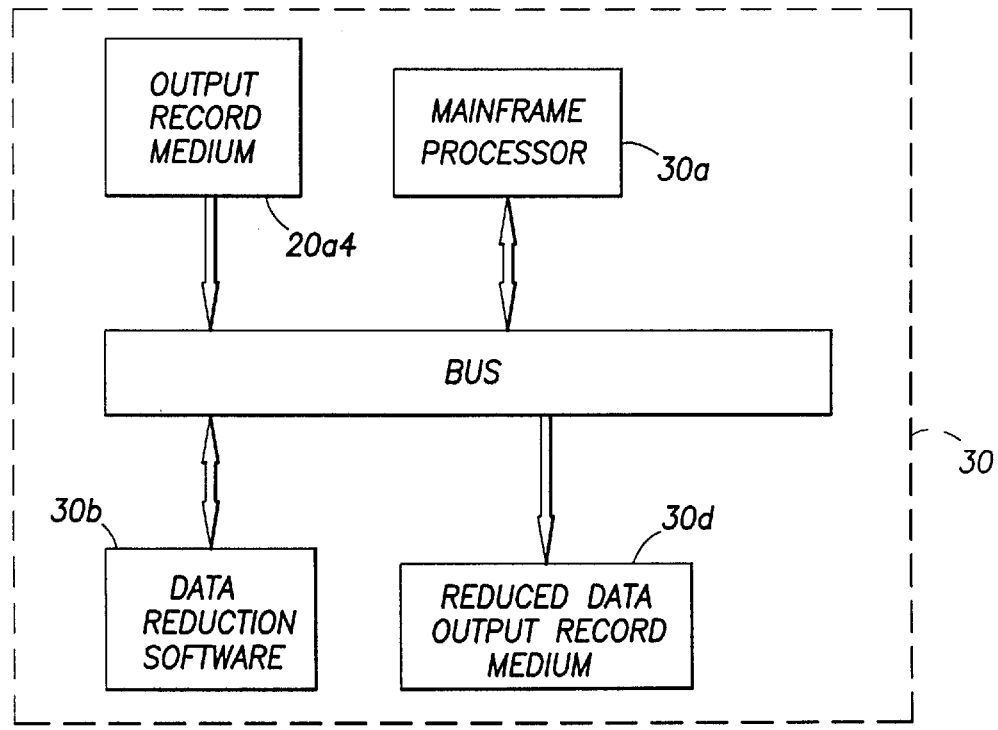
FIG. 4 illustrates a simplified diagram of a mainframe computer which uses a stored data reduction software to perform data reduction on the sets of 3D seismic data stored on the output record medium of FIG. 3 and producing a reduced data output record medium.

Referring to FIG. 4, a simplified diagram of a mainframe computer is illustrated which uses a stored "data reduction software" to perform a "data reduction" operation on the set of 3D seismic data (the 10 traces) stored on the output record medium 20a4 of FIG. 3. The mainframe computer produces a reduced data output record medium which displays and/or stores reduced versions of the set of 3D seismic data.

In FIG. 4, a mainframe computer 30 includes a mainframe processor 30a connected to a system bus and a memory 30b also connected to the system bus which stores a "data reduction software" therein. The output record medium 20a4 of FIG. 3 is connected to the system bus of FIG. 4, and the set of 3D seismic data from the output record medium 20a4 is made available to the mainframe processor 30a and its associated data reduction software stored in the memory 30b. The mainframe processor 30a will execute the data reduction software stored in memory 30a and, as a result of the execution of the data reduction software, the mainframe processor 30a will: (1) perform a "data reduction" operation on the set of 3D seismic data stored on the output record medium 20a4, and (2) generate a "reduced data output record medium" 30d associated with the set of 3D seismic data stored on the output record medium 20a4. Therefore, in FIG. 4, when the data reduction software in memory 30b is executed by the mainframe processor 30a in association with the set of 3D seismic data, a reduced data output record medium 30d will be generated which stores a data-reduced version of the set of 3D seismic data. The data-reduced version of the set of 3D seismic data, stored on the reduced data output record medium 30d, represents spatially corrected subsurface images of the earth formation of FIG. 1. The data reduction technique, described below with reference to FIGS. 7a and 7b, involves the vector sum of the reflections 14 off the earth's layer 16 of FIG. 1.

Referring to FIGS. 7a and 7b, a flowchart of the data reduction software 30b stored in the memory 30b of the mainframe computer 30 of FIG. 4 is illustrated. The data reduction software flowchart of FIGS. 7a and 7b is taken from a book entitled "Seismic Velocity Analysis and the Convolutional Model" by Enders A. Robinson, the disclosure of which has already been incorporated by reference into this specification.

In FIGS. 7a and 7b, the flowchart of the data reduction software 30b includes the following blocks: a demultiplexing block 30b1 connected to the input, a sorting block 30b2, a gain removal block 30b3, a frequency filtering block 30b4, a resampling block 30b5, a trace selection block 30b6, an output 30b7 labelled "selected gathers (velocity analyses), amplitude correction 30b8, deconvolution 30b9, a second output 30b10 labelled "CMP sorted traces after deconvolution", a time corrections block 30b11, an AGC block 30b12, a stacking block 30b13, a third output 30b14 labelled "stacked traces (unfiltered)", a frequency filtering block 30b15, another AGC block 30b16, a fourth output 30b17 labelled "stacked traces (filtered)", a second input labelled "dip information" 30b18, a trace interpolation block 30b19, a migration block 30b20, a fifth output 30b21 labelled "migrated traces (unfiltered)", a frequency filtering block 30b22, an AGC block 30b23, a sixth output 30b24 labelled "migrated traces (filtered)", a time to depth correction block 30b25, and a seventh output 30b26 labelled "migrated traces (depth migrated)". In the flowchart of FIGS. 7a and 7b, any of the outputs 30b7, 30b10, 30b14, 30b17, 30b21, 30b24, and 30b26 can be used as inputs to the interpretation workstation 32 discussed below and illustrated in FIG. 5 of the drawings.

Referring to FIG. 5, an interpretation workstation 32, which stores a new software package known as the "Auto Fault" software in accordance with the present invention, includes a display 32a that will ultimately visually display a plurality of "fault elements", in accordance with the present invention, the "fault elements" being illustrated in FIGS. 24 and 25 of the drawings. The workstation 32 is electrically connected to and it receives the reduced data output record medium 30d (such as a magnetic tape) which was generated by the mainframe computer 30 of FIG. 4. As a result, the data-reduced version of the set of 3D seismic data, stored on the reduced data output record medium 30d of FIG. 4, is loaded into the workstation 32 of FIG. 5.

Referring to FIG. 6, the interpretation workstation 32 of of FIG. 5 is shown in greater detail.

In FIG. 6, the workstation 32 includes the display 32a and a workstation processor 32b connected electrically to the system bus, and a memory 32c also connected electrically to the system bus. The reduced data output record medium 30d, generated from FIG. 4, is connected to the bus; as a result, the set of 3D seismic data stored on the reduced data output record medium 30d is made available to the workstation processor 32b and its associated software stored in the workstation memory 32c. The workstation memory 32c stores two types of software: an IESX Interpretation software 32c1, and an "Auto Fault" software 32c2 in accordance with the present invention. When the workstation processor 32b executes the "Auto Fault" Software 32c2, in association with the IESX Software 32c1, the data-reduced version of the set of 3D seismic data stored in the reduced data output record medium 30d is fully analyzed for the purpose of determining and identifying one or more fault cuts in each valid gap in each horizon in the 3D seismic data. When the data-reduced version of the set of 3D seismic data is fully analyzed, a "particular output" known as "Fault Elements" (shown in FIGS. 24 and 25) is produced, in accordance with the present invention, from which a geoscientist can determine the characteristics of the formation layer 16 of FIG. 1. When such characteristics are known, the possible existance of underground deposits of hydrocarbon in the formation layer 16 may be determined.

The workstation 32 can comprise a Silicon Graphics Indigo2 workstation.

The IESX Interpretation Software 32c2 of FIG. 6, which is stored in the memory 32c of the workstation 32 of FIG. 6, is the operating system, the operating system being IRIX 5.3. The IESX Interpretation software 32c2 program can be written in C programming language under Unix and Motif standards, and the program can be recomplied and run on Sun workstations in conjunction with other IESX products listed below. In addition to the Unix workstation operating environment, the minimum IESX Interpretation software 32c1 required to run the "Auto Fault" software 32c2 of the present invention is as follows:(1) IESX runtime license, part no. UAMR1-QD1 , (2) IESX data manager, part no. UAMD1-QD1, and (3) IESX Seis3DV, Part No. UA3D1-QD1. The IESX Interpretation software 32c1 of FIG. 6 can be obtained by contacting Geoquest, a division of Schlumberger Technology Corporation, Houston, Tex.

Figure 8B:
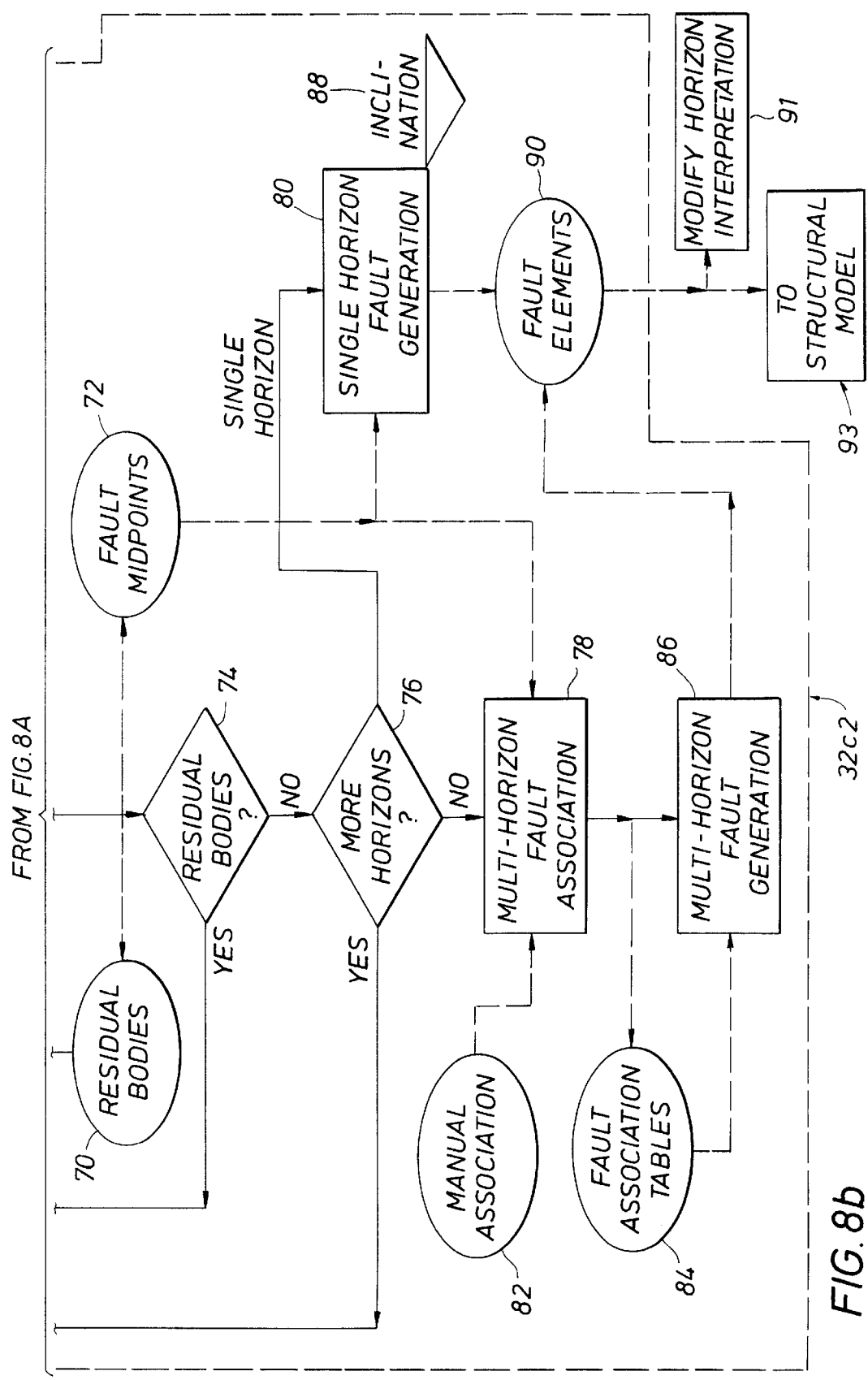

Referring to FIGS. 8a and 8b, a flowchart representing a detailed construction of the "Auto Fault" software 32c2, stored in the memory 32c of the workstation 32 of FIG. 6, is illustrated. The Auto Fault software 32c2 of FIG. 8 comprises a plurality of blocks which include either: (1) method steps performed by the Auto Fault software 32c2 itself, or (2) data files generated by those method steps. Each of the plurality of blocks of the Auto Fault software 32c2 introduced below and illustrated in FIGS. 8a–8b will be discussed in greater detail in later sections of this specification with reference to FIGS. 9 through 26 of the drawings.

In FIGS. 8a and 8b, a horizon time structure 40 data file is generated from a horizon interpretation 42 data file. The horizon time structure 40 data file is used by the Auto Fault software 32c2 program to "analyze horizon discontinuities" 44. The "analyze horizon discontinuities" block 44 makes use of a user supplied "minimum gradient" 46 which will be discussed later. A horizon interpretation gap 48 data file is generated when execution of the "analyze horizon discontinuities" block of code 44 is complete. When execution of the analyze horizon discontinuities 44 block of code is complete and the horizon interpretation gap 48 data file is created, the "connected body analysis" 50 block of code will be executed. When execution of the connected body analysis 50 code is complete, a "connected bodies" 52 data file is created. Another block of code entitled "edit connected bodies" 54 will, when executed, edit the connected bodies 52 data file thereby creating another data file entitled "edited bodies" 56. Still another data file entitled "fault traces" 58 may be provided by the user as an alternative body data file. When the connected body analysis 50 code has completed its execution and the data files 52, 56, and 58 are created, a "test connected bodies" 60 block of code will begin execution, the test connected bodies 60 code being responsive to and utilizing either the fault traces 58 data file, or the connected bodies 52 data file, or the edited bodies 56 data file. The test connected bodies 60 code will also be responsive to two user supplied parameters which will be discussed later: a "minimum length" 62 and a "minimum slope" 64. When the execution of the test connected bodies 60 code is complete, the test connected bodies 60 code will create a "fault polygons" 66 data file, and another block of code entitled "generate midpoint lines" 68 will begin execution while utilizing the fault polygons 66 data file. When execution of the generate midpoint lines 68 code is complete, two more data files are created, namely, "residual bodies" 70 and "fault midpoints" 72, and a decision triangle 74 is encountered which asks: "were any residual bodies created in the residual bodies data file 70?" If residual bodies were created in the residual bodies data file 70, the program loops back to the test connected bodies 60 code, where the test connected bodies 60 code is responsive to the residual bodies data collected in the residual bodies data file 70, and the test connected bodies code 60 and the generate midpoint lines code 68 is re-executed. Following the decision triangle 74, another decision triangle 76 is encountered by the Auto Fault 32c2 program. This other decision triangle 76 asks: "are there additional horizon lines, indicative of additional horizons, in the set of 3D seismic data which has undergone the horizon interpretation 42?". If so, the Auto Fault program 32c2 loops back to the horizon time structure 40 data file. At this point in the execution of the Auto Fault 32c2 program, the horizon time structure 40 data file now represents and includes a horizon time structure 40 for each of the additional horizon lines which were encountered by the decision triangle 76 and were included within the "horizon interpreted" 3D seismic data. If the other decision triangle 76 discovered that additional horizon lines did exist within the set of 3D seismic data, the Auto Fault program 32c2 will execute a "multi-horizon fault association" 78 code. However, if the other decision triangle 76 discovered that additional horizon lines did not exist within the set of 3D seismic data, the Auto Fault program 32c2 will not loop back to the horizon time structure 40, but will, instead, execute a "single horizon fault generation" code 80. In either case, the "multi-horizon fault association" code 78 and the "single horizon fault generation" code 80 will each be responsive to and will utilize the previously mentioned fault midpoints 72 data file. If, in response to the decision triangle 76, the multi-horizon fault association code 78 is executed, in addition to the fault midpoints 72 data file, the multi horizon fault association code 78 will also be responsive to and optionally utilize another data file entitled "manual association" 82 for ultimately generating a further data file entitled "fault association tables" 84; and, when the execution of the multi horizon fault association 78 code is complete and the fault association tables 84 data file is created, a "multi-horizon fault generation" 86 code will begin execution. However, if, in response to the decision triangle 76, the single horizon fault generation 80 code is executed, the execution of the single horizon fault generation code 80: (1) will be responsive to and will utilize the fault midpoints 72 data file, and (2) will be constrained by a user supplied parameter called "inclination" 88. When execution of the multi horizon fault generation code 86 is complete, or when execution of the single horizon fault generation code 80 is complete, a "particular output", in accordance with the present invention, will be generated; and that particular output is called "fault elements" 90. The "fault elements" 90 output will illustrate a plurality of fault cuts for each valid gap in each horizon time structure 40 for each horizon in the set of 3D seismic data, with the horizon extended to contact the fault cuts, as illustrated in FIGS. 24 and 25. When the fault elements 90 data file is created, the horizon interpretation 42 is modified to include all the new fault cuts which were generated by the Auto Fault program 32c2 in the fault elements 90.

A functional description of the operation of the workstation 32 of FIG. 6, when the processor 32b of the workstation 32 is executing the "Auto Fault" software 32c2 of the present invention which is stored in the workstation memory 32c of FIG. 6, will be set forth in the following paragraphs with reference to FIGS. 9a through 26 of the drawings. In the following functional description, each block of code and each data file illustrated in the Auto Fault 32c2 software flowchart of FIGS. 8a–8b will be discussed below in greater detail.

Figure 9A:
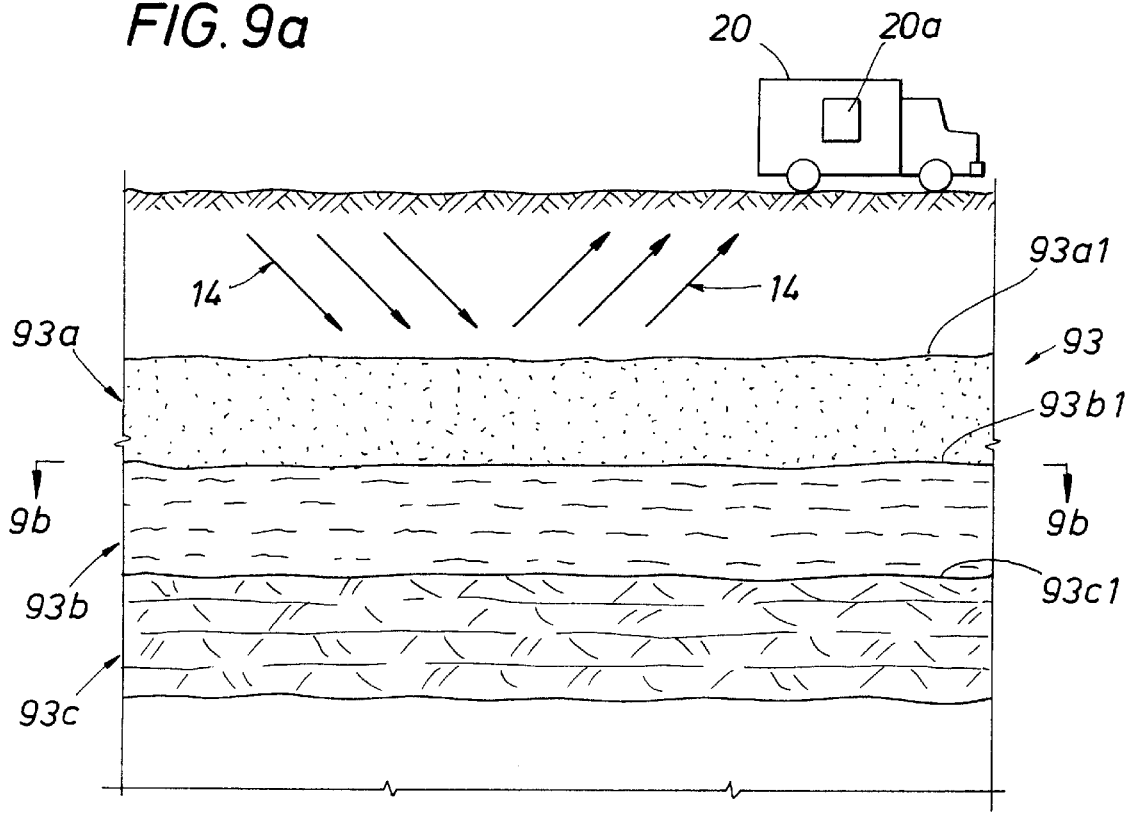
FIG. 9a illustrates a simple example of a side view of an earth formation showing a plurality of earth layers, including sand, shale, and limestone, the top of each such layer representing a "horizon"
Figure 9B:
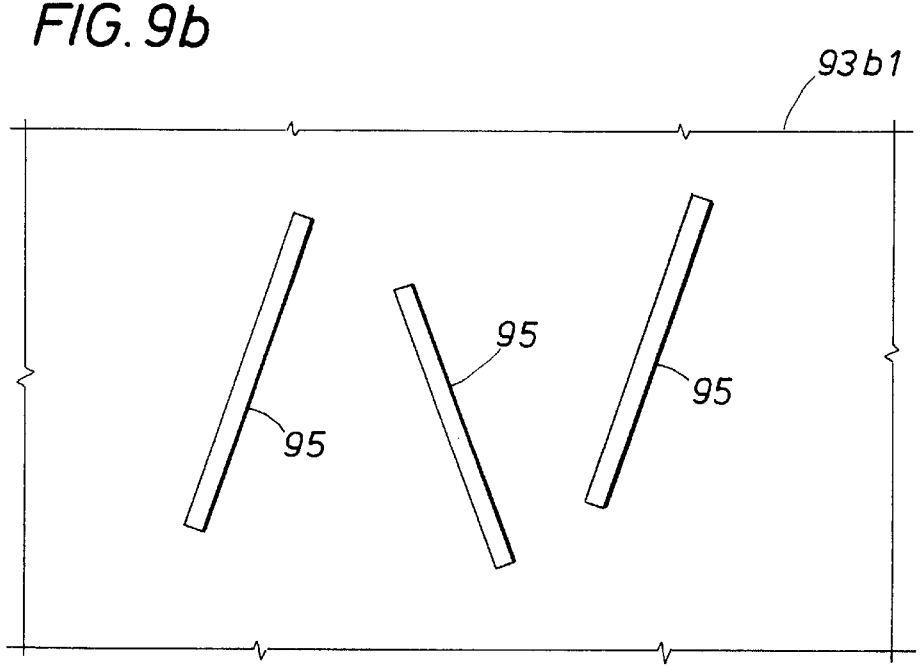

Before beginning the functional description of the Auto Fault 32c2 software, refer now to FIGS. 9a and 9b for a brief definition of the term "horizon".

In FIG. 9a, an earth formation 93 which is being analyzed by the sound vibrations of FIG. 1 includes a sand layer 93a, a shale layer 93b, and a limestone layer 93c. The top of each such layer is called a "horizon". For example, the top side 93a1 of the sand layer 93a is a horizon, the top side 93b1 of the shale layer 93b is a horizon, and the top side 93c1 of the limestone layer 93c is a horizon. Let us now take a look at a top view of one of these horizons. FIG. 9b is a top view of "the top side 93b1 of the shale layer 93b" (that is, a top view of "the horizon 93b1 of the shale layer 93b"), FIG. 9b being an illustration taken along section lines 9b—9b of FIG. 9a.

Figure 20:
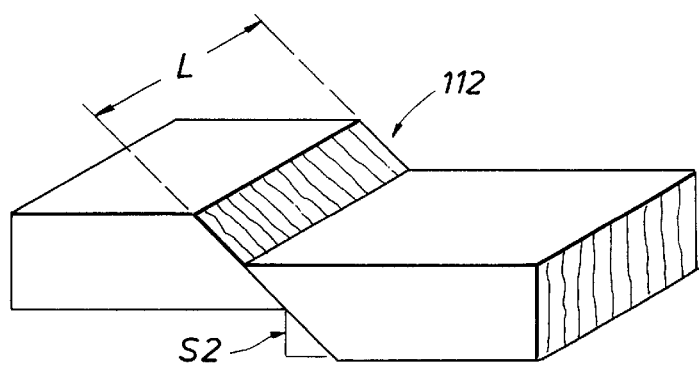

In FIG. 9b, the horizon 93b1 of FIG. 9a is illustrated. This example horizon 93b1 is a very simple example illustration of a "horizon". This "horizon" 93b1 could include a plurality of "gaps" 95. Each of the "gaps" 95 are better illustrated in the three dimensional view shown in FIG. 20 of the drawings. Each of the "gaps" 95 represents a "fault" in the formation 93 (the "fault" in FIG. 20 being represented by the gap 112). A "fault" is usually an angularly oriented "slice" in the formation (as shown in FIG. 20), the "slice" appearing in the form of a "gap" when viewed downwardly from the top onto the horizon 93b1. More realistic examples will be illustrated in FIG. 10a and 10b.

Horizon Interpretation 42 Data File

In FIG. 10a, the data-reduced version of the set of 3D seismic data (hereinafter called the "seismic data"), which is stored on the reduced data output record medium 30d of FIG. 4 and is input to the workstation 32 of FIG. 6, is illustrated. The "seismic data" of FIG. 10a is generated from the seismic operations shown in FIGS. 1 and 2 and includes a plurality of "horizons". The definition of the term "horizon" is as follows: assuming that the earth's formation in FIGS. 1 and 2 includes a plurality of layers (such as sand layer which is situated below a shale layer which is situated below a limestone layer), the top surface of each such layer is called a "horizon".

The term "horizon interpretation" 42 is a term which identifies a data file that is created by an operator. The operator would create the horizon interpretation 42 data file by manually identifying each of the "horizons" in the seismic data of FIG. 10a. For example, in FIG. 10a, the operator would manually identify a horizon 92 in the seismic data of FIG. 10a by manually drawing a plurality of approximately horizontal line segments 92a, 92b, 92c, 92d, 92e, and 92f in the seismic data of FIG. 10a. The horizon 92 is also called an "input seismic horizon" 92. In FIG. 10a, the horizon 92 (consisting of line segments 92a–92f) includes at least one "horizon gap" 95, similar to the gaps 95 shown in FIG. 9b.

However, FIG. 10a represents a side view of the horizon 92 (consisting of line segments 92a through 92f), not a top view. FIG. 10b represents the top view of the horizon 92.

Horizon Time Structure 40 Data File

The "horizon time structure" (represented by element numeral 40 in FIG. 8 and by horizon 92 in FIG. 10b) is a data file that is created by the Auto Fault software 32c2 from the previously input "horizon interpretation" 42 data file. As a result, since the horizon 92 of FIG. 10a corresponds to the "horizon time structure" of FIG. 10b, and since the "horizon time structure" 40 in FIG. 8 corresponds to the horizon time structure in FIG. 10b, the numeral identifier of the "horizon time structure" in the remaining sections of this specification will be "40,92".

In FIG. 10b, the top view of the horizon 92 of FIG. 10a is illustrated. This top view of the horizon 92 of FIG. 10a is called a "horizon time structure" 40,92 (block 40 in FIG. 8). The horizon time structure 40,92 of FIG. 10b, representing a top view of the horizon 92 of FIG. 10a, appears to be a multi-colored surface having a plurality of "gaps" where each "gap" is disposed between adjacent colors. In FIG. 10, one such gap is the "horizon gap" 92g2. In FIG. 10, the horizon time 40,92 includes a seismic line 92g1. If the horizon time 40,92 were sliced vertically into the paper of FIG. 10b at a location corresponding to the seismic line 92g1, and if the resultant slice were viewed from the side, the "seismic data" of FIG. 10a would be visible. Each color in the multi-colored surface of the horizon time 40,92 of FIG. 10b represents a different depth of the horizon 92 below the surface of the earth in FIGS. 1 and 2, and a different time to reflect the sound vibrations 14 off the horizon 92. For example, a first part of the horizon 92 of FIG. 10a can be situated at a greater depth than a second part of the horizon 92 of FIG. 10a, and the time to reflect the sound vibrations 14 off the first part of the horizon 92 of FIG. 10a would be different than the time to reflect the sound vibrations off the second part of the horizon 92 of FIG. 10a. Therefore, the color in the horizon time structure 40,92 of FIG. 10b for the first part of horizon 92 would be different than the color in the horizon time 40,92 of FIG. 10b for the second part of the horizon 92. In FIG. 10b, element numeral 94 illustrates a chart that is intended to be used in conjunction with the horizon time 40,92 of FIG. 10b corresponding to the horizon 92 in FIG. 10a, the chart 94 including a color column 94a and a corresponding time column 94b. To determine reflection time (and depth) on the horizon time 40,92 in FIG. 10b, refer to the chart 94, compare the color from a section of the horizon time 40,92 with the color in column 94a, and read the reflection time in column 94b.

Analyze Horizon Discontinuities 44 Code and Minimum Gradient 46

In FIGS. 10b, 11 and 12 and 20, referring initially to FIG. 10b, the Auto Fault software 32c2 locates valid breaks or gaps (such as 95) in the horizon time structure 40,92, each of the gaps 95 resulting from a "fault" passing through the horizon 92 at a location corresponding to the gap. In FIG. 20, an example of a "fault" is illustrated. Note that the fault in FIG. 20 has a certain length "L" and a certain slope.

The analyze horizon discontinuities 44 part of the Auto Fault software 32c2 will locate valid gaps (such as 95) in the horizon time 40,92 by: (1) identifying a void space or gap in the horizon time 40,92 where no interpretation exists (such as 95), or (2) locating sharp breaks in the horizon time structure 40,92. For example, if a first part of the horizon time structure 40,92 is green and a second immediately adjacent part of the horizon time 40,92 is red (color changes immediately from green to red), this instantaneous change in color on the horizon time 40,92 would indicate either a void space/gap or a sharp break in the horizon time structure 40,92. However, some void spaces/gaps or breaks are too small and are not considered as "valid gaps".

The minimum gradient 46 is a user supplied parameter representing a minimum acceptable time difference (i.e., difference in horizon time across the gap) of a void space/gap or sharp break on the horizon time structure 40,92. If a first potential gap on the horizon time structure 40,92, such as gap 95, has a time difference (i.e., the difference in horizon time across the gap) which is lower than the user supplied minimum gradient 46 (i.e., the gap has a slope which is near zero), the analyze horizon discontinuities 44 code will ignore that first potential gap since the first potential gap is not a "valid gap"; however, if a second potential gap on the horizon time 40,92 has a time difference which is greater than or equal to the minimum gradient 46, the analyze horizon discontinuities 44 code will identify the second potential gap as a "valid gap". Therefore, all such void spaces/gaps and sharp breaks (such as 95) on the horizon time 40,92 which have a time difference that is greater than or equal to the minimum gradient 46 are identified, by the analyze horizon discontinuities code 44, as being "valid gaps".

In FIG. 11, when all the "valid gaps" on the horizon time 40,92 of FIG. 10b are identified by the "analyze horizon discontinuities" 44 code, a grid structure 96 is overlayed, by the analyze horizon discontinuities code 44, on top of the horizon time 40,92 thereby subdividing the horizon time 40,92 into a plurality of blocks 98. For example, in FIG. 11, a pair of valid gaps 100 on the horizon time 40,92 have already been identified since these gaps 100 have time differences that are greater than the minimum gradient 46. The grid structure 96 is then overlayed on top of the horizon time 40,92 thereby subdividing the horizon time 40,92 into the plurality of blocks 98.

In FIG. 12, each block of the plurality of blocks 98 which contains a section of the valid gaps 100 of FIG. 11 is assigned a binary code "1", and each block of the plurality of blocks 98 which does not contain a section of the valid gaps 100 of FIG. 11 is assigned the binary code "0". For example, in FIG. 12, blocks 98a through 98m were assigned, by the analyze horizon discontinuities code 44, the binary code "1" because these blocks 98a–98m contained a part of the valid gaps 100 of FIG. 11; the remaining blocks 98 in FIG. 12 were assigned the binary code "0" because these blocks did not contain a part of the valid gaps 100.

Horizon Interpretation Gap 48 Data File

In FIG. 13, the horizon interpretation gap 48 of FIG. 8 is illustrated. The horizon interpretation gap 48 shown in FIG. 13 is defined to be the horizon time 40,92 of FIG. 12 including the binary 1's and binary 0's assigned to the blocks 98. Note that, in the horizon interpretation gap 48 of FIG. 13, the binary 1's appear in the blocks 98a through 98m (of FIG. 12) and the binary 0's appear in the remaining blocks 98 of the horizon time structure 40,92.

Connected Body Analysis 50 code

During execution of the connected body analysis code 50 of FIG. 8a, all of the individual and separate bodies in the horizon interpretation gap 48 of FIG. 13 are connected together and colored separately from other non-touching individual and separate bodies. That is, whenever a first body touches another second body, the first and second bodies: (1) are really part of the same fault, (2) should not be separately distinguished, and (3) should be colored with the same color. The connected body analysis code 50, when executed, will set up all the individual and separate bodies in the horizon interpretation gap 48 of FIG. 13 (which do not touch any other body) as separate bodies and will color them separately from any other individual and separate body on the horizon interpretation gap 48.

Figure 14:
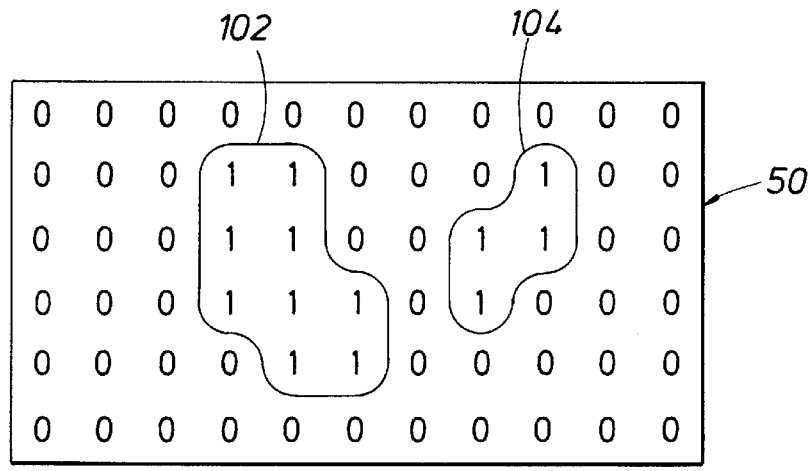
FIGS. 14 illustrate the functional operation of the "connected body analysis", which is part of the "Auto Fault" software flowchart of FIGS. 8a–8b.

In FIGS. 13 and 14, for example, the horizon interpretation gap 48 of FIG. 13 is generated as a data file by the Auto Fault software 32c2 of FIG. 6; and then, as indicated in FIG. 14, the connected body analysis code 50 will draw a first line 102 around a first body which consists of the binary 1's in blocks 98a–98i (of FIG. 12), the first line 102 being hereinafter called "the first body 102". In addition, the connected body analysis code 50 will draw a second line 104 around a second body which consists of the binary 1's in blocks 98j–98m (of FIG. 12), the second line 104 being hereinafter called "the second body 104".

Connected Bodies 52 Data File

Figure 15A:
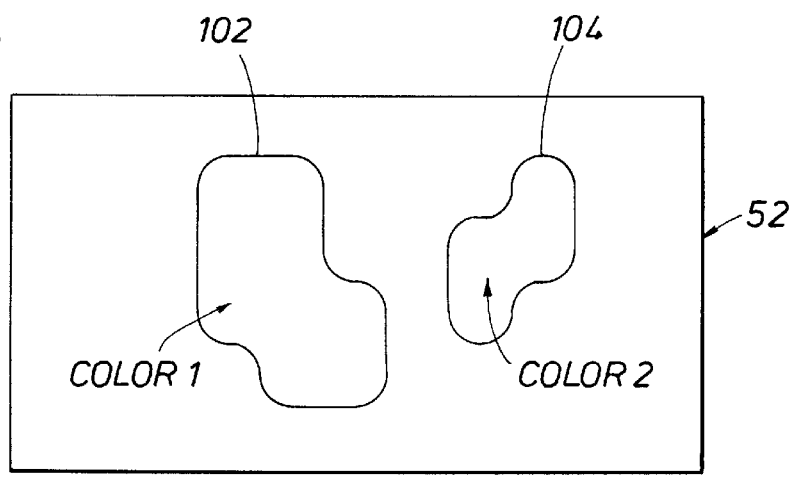

In FIGS. 15a and 15b, the connected bodies 52 data file is illustrated. The connected bodies 52 data file is created when execution of the connected body analysis code 50 of FIGS. 8a and 14 is complete.

For example, in FIG. 15a, the connected bodies 52 data file includes the first body 102 and the second body 104, the first body 102 being an individual and separate body from the second body 104 (because the first and second bodies 102, 104 do not touch each other). Therefore, the first body 102 is colored with a first color ("color 1") and the second body 104 is colored with a second color ("color 2"), the first color of the first body 102 being different from the second color of the second body 104.

In FIG. 15b, a more realistic connected bodies 52 data file is illustrated.

Edit Connected Bodies 54 Code and Edited Bodies 56 Data File

Figure 16:
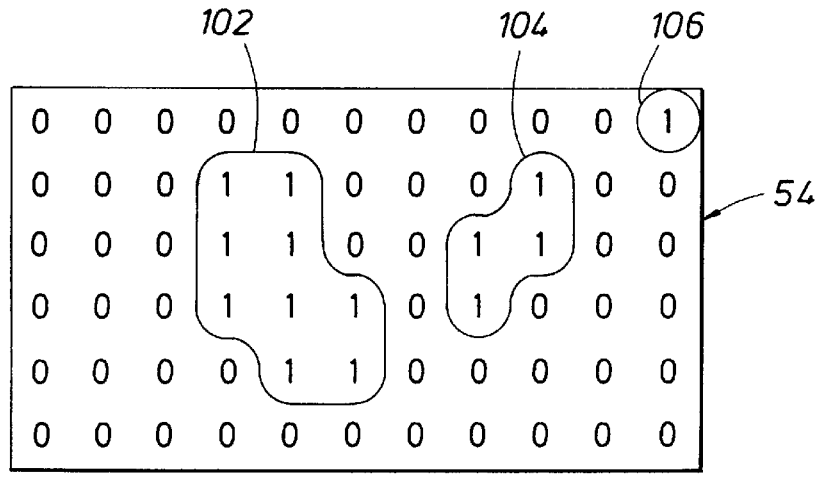
FIGS. 16 and 17 illustrate the functional operation of the "edit connected bodies" and the "edited bodies", which are two blocks appearing on the "Auto Fault" software flowchart of FIGS. 8a–8b.
Figure 17:
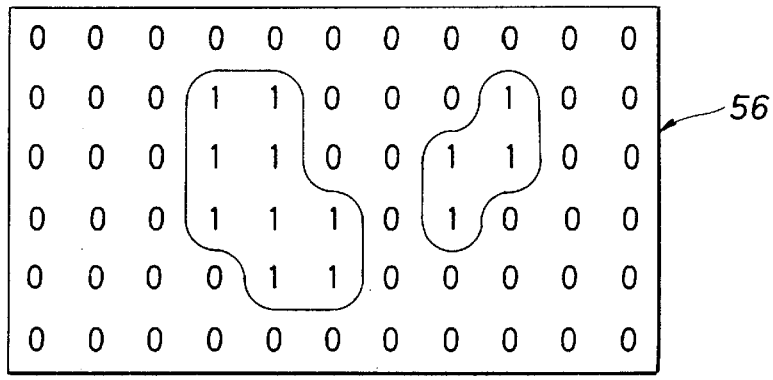

In FIGS. 16 and 17, assume that, during the connected body analysis 50 of FIG. 14, the first body 102, the second body 104, and a third body 106 were separately identified, and that the connected bodies 52 data file of FIGS. 15a and 15b included all three bodies: the first body 102, the second body 104, and the third body 106. The edit connected bodies 54 code, of FIGS. 8a and 16, will edit and correct the connected bodies 52 data file by eliminating erroneously identified bodies, that is, bodies that were created by noise and not from portions of a "valid gap".

In FIG. 16, the edit connected bodies code 54 will notice that the third body 106 is an erroneously identified body (created from noise) and it will edit-out the third body 106.

In FIG. 17, the edited bodies 56 data file is illustrated, and note that the third body 106 has been eliminated from the edited bodies 56 data file.

Fault Traces 58 Data File

Figure 18:
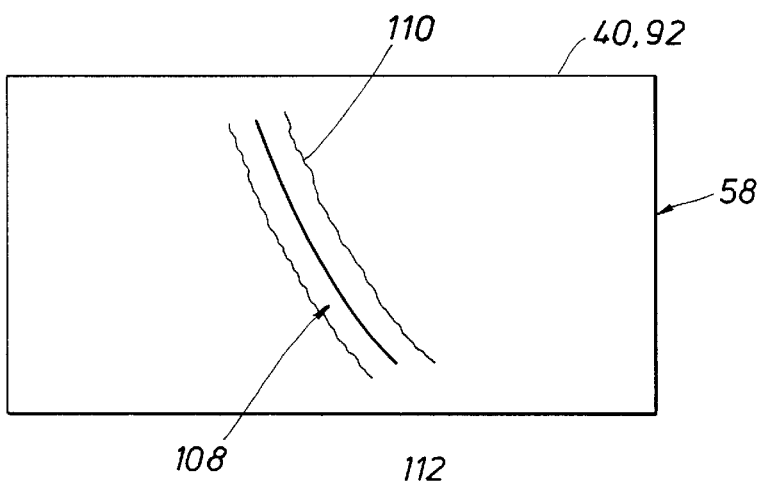
FIG. 18 illustrates the functional operation of the "fault traces" block appearing on the "Auto Fault" software flowchart of FIGS. 8a–8b.

In FIGS. 10 and 18, the operator may hand draw a "valid gap" on the horizon time 40,92 of FIG. 10b. This hand-drawn gap is part of a data file that is created by the operator and is entitled "fault traces" (element numeral 58 in FIG. 8a).

In FIG. 18, for example, assume that the operator notices a void space or sharp break 110 on the horizon time structure 40,92. Believing that this void space 110 indicates a "valid gap", the operator hand draws a gap 108 inside the void space 110 on the horizon time structure 40,92. This hand drawn gap 108 is called a "fault trace". The "fault trace" 108 is part of a larger data file identified in FIG. 8 as the "fault trace data file" 58.

Test Connected Bodies 60 code

In FIG. 8a, three data files are provided as inputs to the test connected bodies 60 code: fault traces 58, connected bodies 52, and edited bodies 56. Each of these three data files provide information pertaining to a plurality of "gaps" (or "bodies" reflecting those "gaps") on the horizon time structure 40,92.

Recalling that the test connected bodies 60 code of FIG. 8 is executed in association with two operator-supplied parameters, minimum length 62 and minimum slope 64, the test connected bodies 60 code will, when executed, determine if each of the plurality of "gaps" in the above identified three data files (fault traces 58, connected bodies 52, and edited bodies 56) are "valid gaps" by: (1) comparing each of the "gaps" with the operator supplied minimum length 62 and minimum slope 64; (2) if the particular "gap" has a length and a slope which is greater than or equal to the minimum length 62 and minimum slope 64, the particular "gap" is said to be a "valid gap"; (3) on the other hand, if the particular "gap" has a length and a slope which is lower than the minimum length 62 and the minimum slope 64, the particular "gap" is not a "valid gap".

Figure 19:
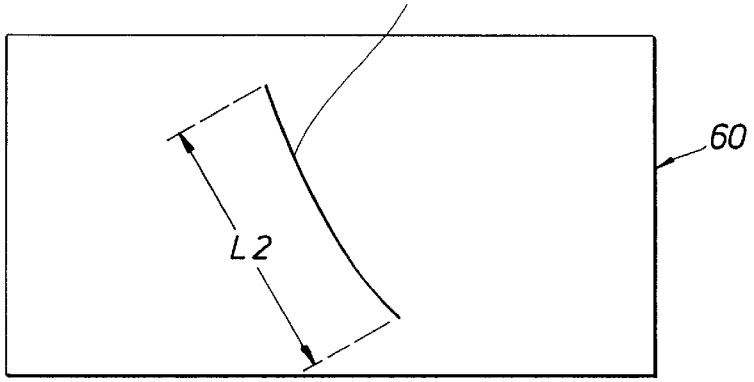
FIGS. 19 and 20 illustrate the functional operation of the "test connected bodies" block appearing on the "Auto Fault" software flowchart of FIGS. 8a–8b.

In FIGS. 19 and 20, for example, a "gap" 112 represents one of the plurality of "gaps" in the above identified three data files (fault traces 58, connected bodies 52, and edited bodies 56). The gap 112 has a length "L2" (FIG. 19) and a slope "S2" (FIG. 20). Assume that the minimum length 60 parameter is a length "L1" and the minimum slope 64 parameter is a slope "S1". The gap 112 in FIGS. 19 and 20 is a "valid gap" when: L2>L1 and S2>S1.

If L2 is not greater than L1, and S2 is not greater than S1, there is no displacement and probably no fault; that is, the gap 112 may represent a bad data area where no interpretation exists.

Plausibility testing of each "gap" 112, to determine if such gap is a "valid gap", would include the following steps: (1) determine if there are a minimum number of points in the gap 112 to achieve acceptance as a valid fault gap, (2) determine if the gap 112 has a minimum length to achieve acceptance, (3) reject if "perfectly" parallel to inline or crossline direction by regression test (optional), and (4) determine if there is a minimum slope across the gap 112 to achieve acceptance.

Fault Polygons 66 Data File

When all of the plurality of "gaps" in the above identified three data files (fault traces 58, connected bodies 52, and edited bodies 56) are tested, by the test connected bodies 60 code in association with the minimum length 62 parameter and the minimum slope 64 parameter, a plurality of "valid gaps" are produced. A new data file is then created, entitled "fault polygons" 66, which includes and stores the plurality of "valid gaps".

Figure 21:
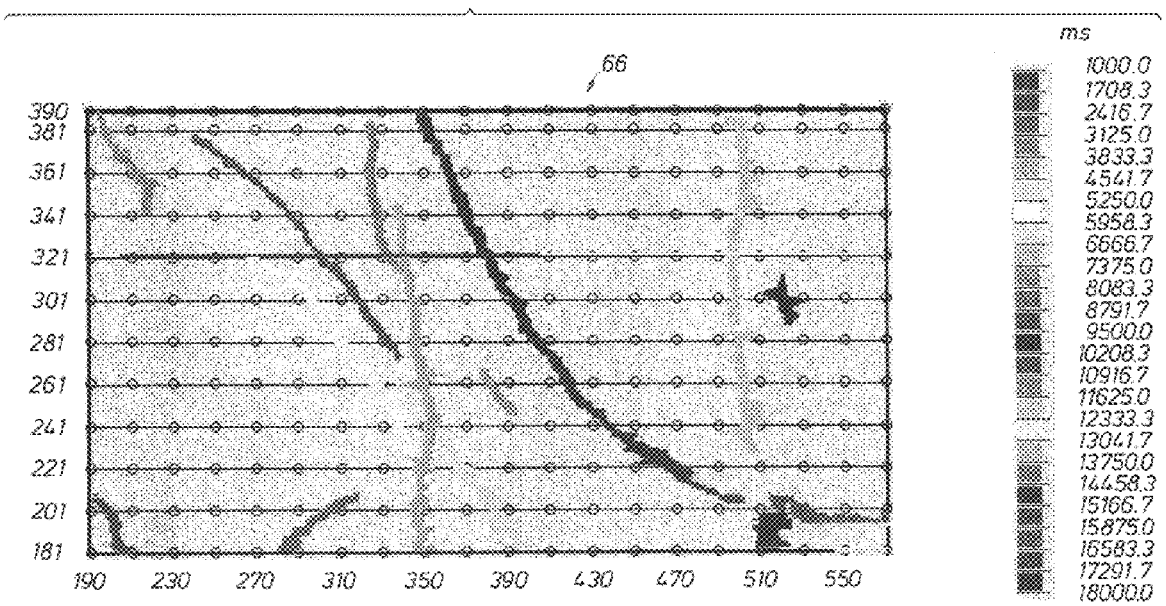
FIG. 21 illustrates an example of the "fault polygons" which is one block on the "Auto Fault" software flowchart of FIGS. 8a–8b.

In FIG. 21, a realistic drawing depicting the "fault polygons" 66 data file, for storing and illustrating a plurality of "valid gaps", is illustrated.

Generate Midpoint Lines 68 Code

In FIG. 21, the fault polygon 66 data file has been created which includes a plurality of valid gaps in the horizon time structure 40,92. However, for each "valid gap", we still do not know where the fault, itself, is located within each of the "valid gaps". The generate midpoint lines 68 code will locate a plurality of midpoints in the center of each of the "valid gaps" and draw a midpoint line which is centered along the plurality of midpoints. This is accomplished for the ultimate purpose of drawing fault cuts in the gaps where the fault cuts pass through each of the plurality of midpoints on the midpoint line.

Figure 22:
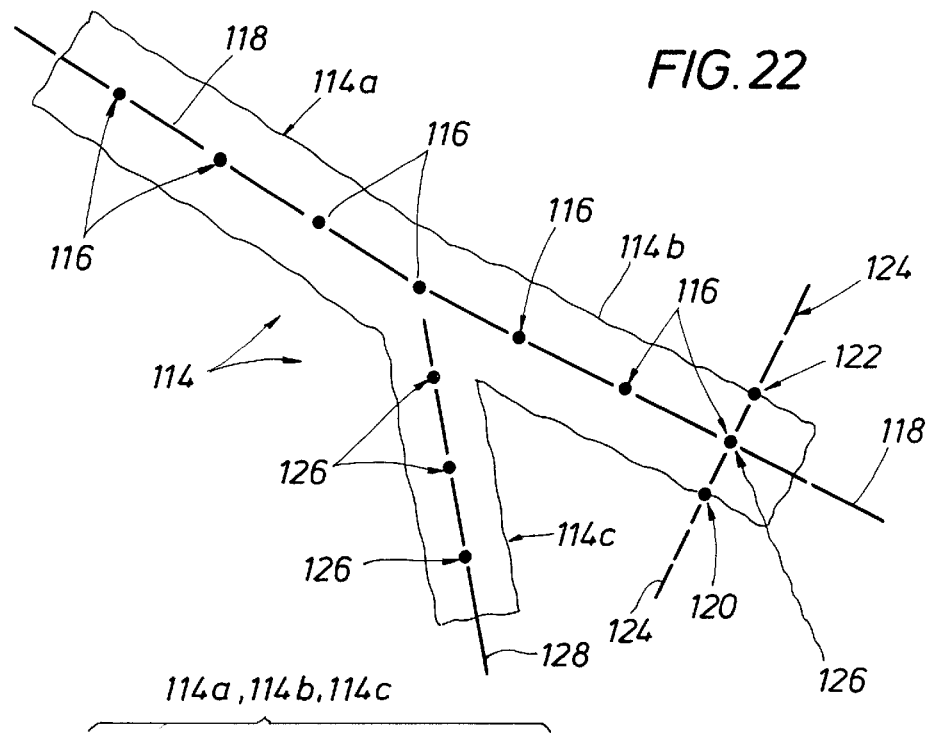
FIG. 22 illustrates the functional operation of the "generate midpoint lines" block on the "Auto Fault" software flowchart of FIGS. 8a–8b.

In FIG. 22, for example, assume that the fault polygon 66 data file includes a "valid gap" 114, the valid gap 114 including a first gap 114, a second gap 114b, and a third gap 114c. The generate midpoint lines 68 code (1) locate the plurality of midpoints 116 at the center of gaps 114a and 114b, and (2) draw a midpoint line 118 which is centered along the plurality of midpoints 116.

Each of the plurality of midpoints 116 will be determined as follows: in FIG. 22, the operator at the workstation 32 of FIG. 6 will pick a time value representing a point 120, pick another time value representing a point 122, draw a straight line 124 between points 120 and 122, and pick the midpoint 126 which is located at the center of the straight line 124.

Residual Bodies 70 Data File and Residual Bodies Decision Triangle 74 and Fault Midpoints 72 Data File In FIGS. 8b and 22, when the midpoint line 118 has been drawn for the gaps 114a and 114b in FIG. 22, the Auto Fault program 32c2 asks, via decision triangle 74 in FIG. 8, whether any "residual bodies" exist in the valid gap 114 of FIG. 22. If "residual bodies" do exist in gap 114 of FIG. 22, the data for such "residual bodies" will be located and stored in the residual bodies 70 data file of FIG. 8b. If the "residual bodies" do exist, the residual bodies in the residual bodies data file 70 will be tested, via the test connected bodies code 60 in FIG. 8, and, if the residual bodies pass that test, midpoint lines will be drawn in the residual bodies via the generate midpoint lines code 68 in FIG. 8a.

In FIG. 22, for example, the gap 114c is called a "residual body" because the gap 114c breaks away from the other gaps 114 and 114b (gaps 114a and 114b are deemed by the Auto Fault program to be one valid gap). When the midpoint line 118 was drawn by the generate midpoint lines code 68 (as noted above) for gaps 114a and 114b in FIG. 22, the Auto Fault program 32c2: (1) noted that the gap 114c is a "residual body", and (2) determined that the answer to the question in the decision triangle 74 of FIG. 8 ("are there any residual bodies?") is "yes". In that case, the Auto Fault program 32c2 of FIG. 8 will loop back from decision triangle 74 to the test connected bodies code 60, whereupon the test connected bodies code 60 will test the residual bodies gap 114c for minimum length and slope (in the manner discussed in the above paragraphs of this specification). If the residual bodies gap 114c passes the "test connected bodies 60" test, the generate midpoint lines code 68 will: generate midpoints 126 inside the residual bodies gap 114c, and draw the midpoint line 128 in the gap 114c, the midpoint line 128 being centered along the midpoints 126 in the gap 114c.

In FIG. 22, all of the midpoints 116 and 126 will be stored in the fault midpoints data file 72 of FIG. 8b.

Decision Triangle 76—More Horizons?

All of the above discussion above, with reference to FIGS. 8a–8b and 9a through 22, relates to one horizon, the horizon 92 in FIG. 10a. The same analysis presented above, with respect to horizon 92 in FIG. 10a, can be repeated with respect to another horizon in FIG. 10a. For example, the operator would: (1) manually identify another horizon in FIG. 10a (re-perform "horizon interpretation" 42 on the set of seismic data in FIG. 10a), and (2) generate a second horizon time structure similar to the "horizon time structure" 40,92 shown in FIG. 10b. When the second horizon time structure is generated, the steps of the Auto Fault 32c2 program of FIG. 8a–8b, beginning with the analyze horizon discontinuities 44 step and ending with the decision triangle 74, will be repeated. In addition, still more, additional horizons can be either "manually" or "automatically" identified in the set of seismic data of FIG. 10a, additional horizon time structures can be generated from the additional horizons, and steps 44 through 74 of the Auto Fault program 32c2 can be repeated.

If no additional horizons are manually identified by an operator in the set of seismic data of FIG. 10a, the Auto Fault 32c2 program will begin to execute the "multi horizon fault association" code 78 of FIG. 8b (discussed below). On the other hand, if only a single horizon was manually identified by the operator in the set of seismic data of FIG. 10a, the Auto Fault 32c2 program will begin to execute the "single horizon fault generation" code 80 of FIG. 8b (discussed below)

Single Horizon Fault Generation 80 and Inclination 88

The "single horizon fault generation" code 80 will: (1) draw a fault cut through each of the midpoints in each of the valid gaps using the inclination 88, and (2) extend the horizon adjacent each of the gaps from the left edge and from the right edge of the gap to the first and second fault contacts on each of the newly drawn fault cuts. The following discussion will discuss each of these points in detail.

In FIG. 22, the midpoint lines 118 and 128 for the valid gaps 114a, 114b, and 114c were generated, the midpoint lines 118 and 128 passing through the plurality of midpoints 116 and 126, respectively. It is now time to draw a plurality of fault cuts through the respective plurality of midpoints, one fault cut being drawn through each midpoint of the plurality of midpoints 116 and 126 in FIG. 22.

Figure 23A:
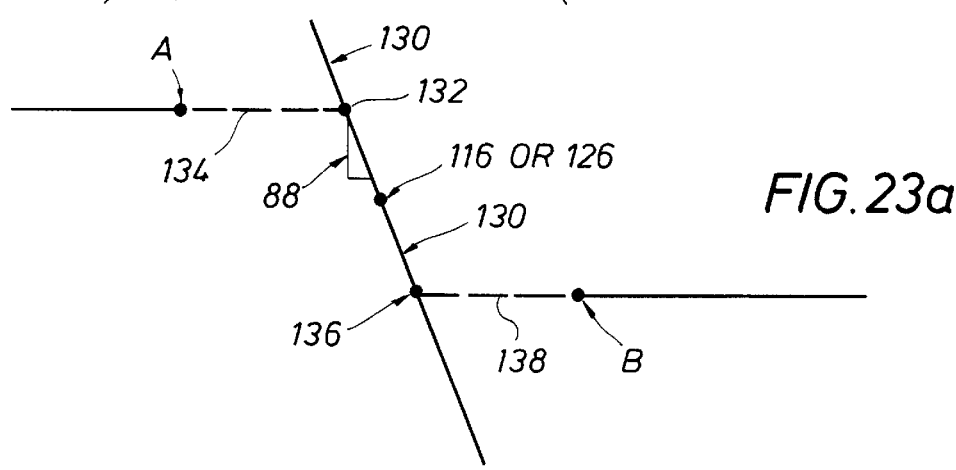
FIGS. 23a–23b illustrates the functional operation of the "single horizon fault generation" block on the "Auto Fault" software flowchart of FIGS. 8a–8b.
Figure 23B:
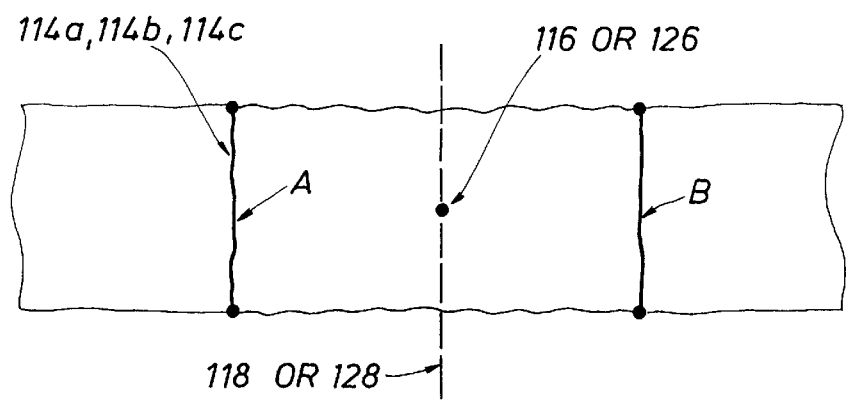

In FIGS. 23a and 23b, FIG. 23b illustrates a top view of one of the valid gaps 114a, 114b, or 114c shown in FIG. 22, and FIG. 23a illustrates a side view of the valid gap shown in FIG. 23b. Let us start with FIG. 23b.

In FIG. 23b, a top view section of one of the gaps 114a, 114b, or 114c of FIG. 22 is illustrated. Note the location of the midpoint 116 or 126 and the midpoint line 118 or 128 passing through the midpoint 116 or 126. In addition, the gap 114a, 114b, 114c includes a left edge "A" and a right edge "B". Recall again that these valid gaps 114a, 114b, 114c appear on the horizon time 40,92 of FIG. 10b.

In FIG. 23a, a side view of the gap of FIG. 23b is illustrated. Note the location of the left edge "A", the right edge "B", and the midpoint 116 or 126.

In FIG. 23a, the "inclination" 88 of the Auto Fault 32c2 code of FIG. 8b is an operator supplied parameter which represents the "slope" of a "fault cut" 130 which will be drawn, by the Single Horizon Fault Generation 80 code, through the midpoint 116 or 126. Accordingly, the single horizon fault generation code 80 will recognize the inclination 88 supplied by the operator, and this code 80 will draw the fault cut 130 through the midpoint 116 or 126 at a slope which is equal to the operator supplied "inclination" 88 parameter. The resultant fault cut 130, drawn by the single horizon fault generation code 80, is shown in FIG. 23a of the drawings.

However, in addition to drawing the fault cut 130 in FIG. 23a through each of the midpoints 116 and 126 shown in FIG. 22 thereby producing a plurality of newly drawn fault cuts 130, the single horizon fault generation code 80 must also perform one more additional function for each of the plurality of newly drawn fault cuts 130: in FIG. 23a, the single horizon fault generation code 80 must also extend the horizon from the left edge "A" in FIG. 23a to a first fault contact 132 on the fault cut 130 resulting in an extension 134 of the horizon shown in FIG. 23a, and the code 80 must extend the horizon from the right edge "B" in FIG. 23a to a second fault contact 136 on the fault cut 130 resulting in an extension 138 of the horizon shown in FIG. 23a.

Fault Elements 90

In accordance with the present invention, the "fault elements" 90 data file will now be created.

The "fault elements" 90 data file of FIG. 8 includes the following data: (1) the fault cuts 130 drawn through each of the midpoints of valid gaps on horizon 92 of FIG. 10b, and (2) the extensions 134,138 provided to the fault contacts 132,136 of the fault cuts 130 in the manner discussed above with reference to FIGS. 23a and 23b.

In FIG. 24, when the "single horizon fault generation" code 80 (1) draws a fault cut through each of the midpoints 116 or 126 in each of the valid gaps 114 of horizon 92 at a slope equal to the operator supplied inclination parameter 88, and (2) provides extensions 134, 138 adjacent each of the gaps from the left edge "A" and from the right edge "B" of the gap to the first and second fault contacts 132, 136 on each of the newly drawn fault cuts 130, the plurality of fault cuts 130 will be drawn for each valid gap on horizon 92 and the plurality of extensions 134, 138 will also be drawn until the extensions 134, 138 contact the fault contacts 132, 136 on the fault cuts in the manner illustrated in FIG. 24.

FIG. 24, therefore, illustrates the horizon 92 of FIG. 10b including "a plurality of output fault elements", in accordance with the present invention; that is, the fault cuts 130 already drawn and the extension 134,138 already provided to the fault contacts 132,136 for each of the valid gaps 114 on the horizon 92 in the set of seismic data shown in FIG. 10b.

FIG. 25 illustrates the output fault elements of FIG. 24 in a top, map view: the plurality of fault cuts 130 are shown to be drawn through each of the midpoints 116,126 and the extensions 134,138 are provided from edges "A" and "B" for contacting the fault contacts 132,136 on the fault cuts 130 in a top view of a particular horizon time structure 40,92, the particular horizon time 40,92 corresponding to the horizon 92 of FIG. 10a.

Multi Horizon Fault Association 78 and Manual Association 82 and Fault Association Tables 84

Assume now that more than one horizon 92 was analyzed by the Auto Fault 32c2 program of FIGS. 6 and 8. That is, when the decision triangle 76 was encountered by the Auto Fault program 32c2, the decision was "yes" and the Auto Fault program 32c2 looped back to the horizon time structure 40 of FIG. 8a, and the steps "analyze horizon discontinuities" 44 to decision triangle 74 of FIGS. 8a–8b were repeated a number of times. As a result, the fault midpoints file 72 is created which contains all the fault midpoints generated by the Auto Fault program 32c2.

Figure 26A:
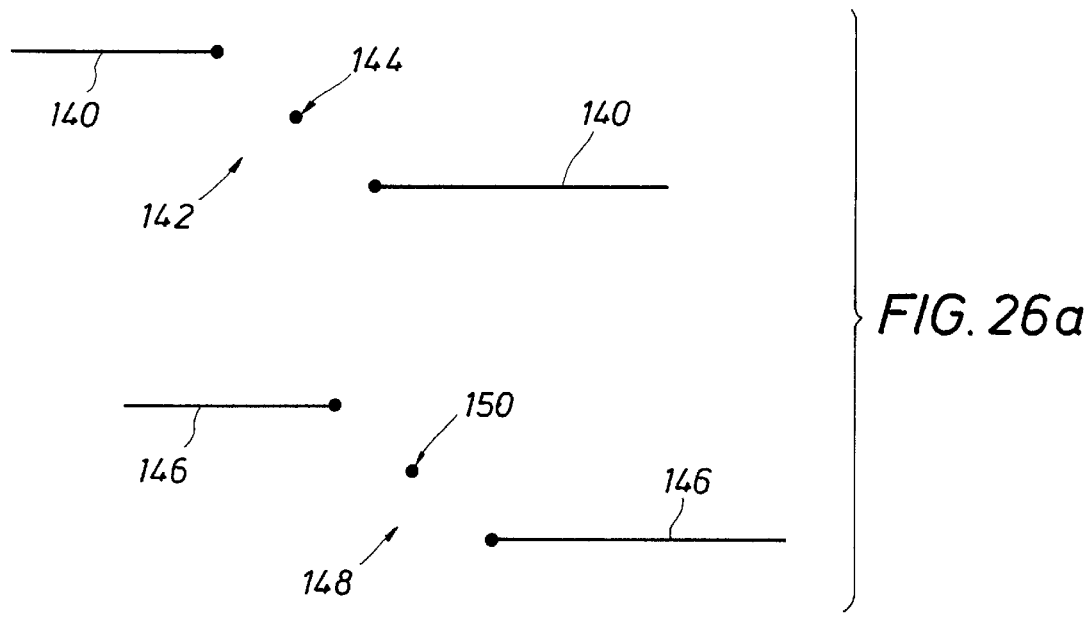
FIGS. 26a–26b assist in illustrating the functional operation of four blocks appearing on the "Auto Fault" software flowchart of FIGS. 8a–8b: (1) the "multi-horizon fault association", (2) the "multi-horizon fault generation", (3) the "fault association tables", and (4) the "manual association".

In FIG. 26a, a pair of horizons are illustrated. A first horizon 140 is separated by a gap 142, and a midpoint 144 has been centered, by the generate midpoint lines 613 code, in the center of the gap 142. In addition, in FIG. 26a, a second horizon 146 is separated by a gap 148, and a midpoint 150 has been centered in the middle of the gap 148. The problem now is to decide whether the midpoint 144 and the midpoint 150 fall on the same fault cut line, or different fault cut lines. Imagine now that the fault midpoints file 72 contains information relating to a multitude of pairs of horizons (in the set of seismic data shown in FIG. 10a) and a multitude of gaps in each horizon and a multitude of pairs of midpoints between the gaps of the horizons. The Auto Fault program must decide which pairs of midpoints (e.g.— midpoints 144, 150 in FIG. 26a) between pairs of gaps (e.g.—gaps 142, 148 in FIG. 26a) fall on the same fault cut line.

The multi horizon fault association 78 code will determine, in response to the data stored in the manual association 82 and the fault midpoints 72 data files, whether the midpoints 144 and 150 in each of the multitude of gaps in the pairs of horizons in the set of seismic data of FIG. 10a fall on the same or different fault cut lines. When this determination is made, a new data file will be created, entitled "fault association tables" 84, for storing a set of results that identify all of the pairs of midpoints in the fault midpoints file 72 that individually fall on the same fault cut line.

Figure 26B:
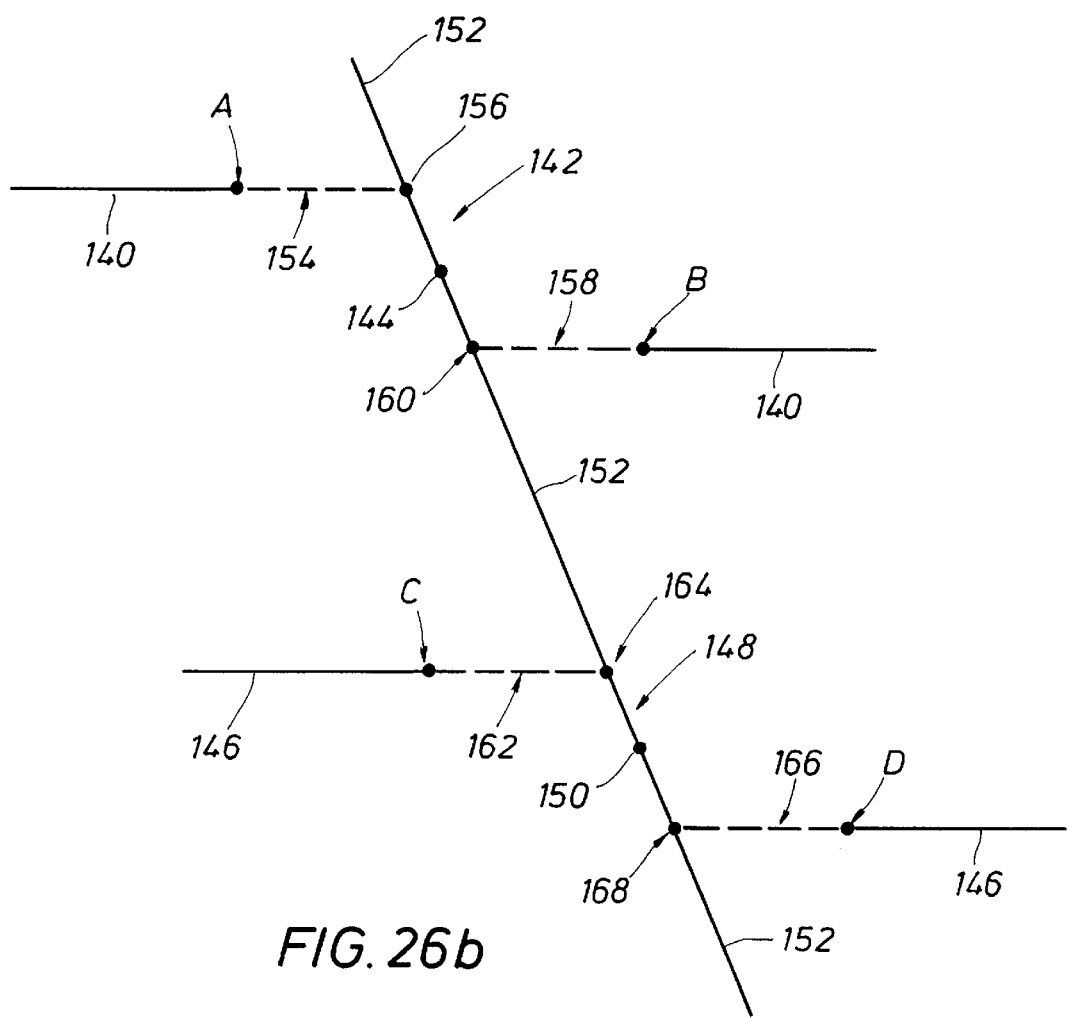

Manual Association 82 data file—in FIG. 26b, an operator will manually draw a fault cut 152 through a pair of midpoints 144,150 associated with two gaps 142,148 in a pair of horizons 140,146 in the set of seismic data of FIG. 10a. The operator may repeat this procedure by providing other manually drawn fault cuts through other pairs of midpoints associated with the same or other gaps. As a result, a data file will be created, entitled "manual association" 82 of FIG. 8b, which will contain all of the manually drawn fault cut information provided by the operator. The manual association 82 data file will be provided as an input to the multi horizon fault association code 78.

Multi Horizon Fault Association 78 code—in FIG. 26a, in response to the data stored in the "fault midpoints" file 72 of FIG. 8b, and in response to the operator supplied fault cut information provided by the "manual association" 82, the multi horizon fault association 78 code of FIG. 8b will determine that the following midpoint pair in the fault midpoints file 72 will fall on and coincide with the same fault cut line: midpoint 144 and midpoint 150 in FIG. 26a. In fact, the multi horizon fault association code 78 will determine which pairs of midpoints (e.g.—midpoints 144, 150), of the multitude of midpoints stored in the fault midpoints file 72, fall on the same fault cut line.

Fault Association Tables 84 data file—When execution of the multi horizon fault association code 78 is complete, the fault association tables 84 data file of FIG. 8 will store information identifying all of the pairs of midpoints (e.g.— midpoints 144, 150 of FIG. 26a) that are stored in the fault midpoints file 72 and individually fall on and coincide with the same fault cut line. For example, in FIG. 26a, midpoints 144 and 150 will be determined, by the multi horizon fault association code 78, to fall on the same fault cut line, and, as a result, information will be stored in the fault association tables 84 identifying midpoints 144 and 150 in FIG. 26a as falling on the same fault cut line.

Multi Horizon Fault Generation 86 and Fault Elements 90

Now that the fault association tables 84 have been created, the next step in the execution of the Auto Fault program 32c2 is to execute the mult horizon fault generation 86 code.

In FIG. 26a, the fault association tables 84 identify all the midpoint pairs that fall on the same fault cut line; for example, the tables 84 will indicate that midpoints 144 and 150 fall on the same fault cut line.

Multi Horizon Fault Generation 86 code—In FIG. 26b, during the execution of the multi horizon fault generation 86 code, the following functional operation will be performed in association with each midpoint pair that is identified in the fault association tables 84 as falling on the same fault cut line. For example, in FIG. 26b, the following functional operation will be performed in association with the midpoint pairs 144 and 150 that have been identified in the fault association tables 84 as falling on the same fault cut line:

(1) a fault cut 152 will be drawn between midpoint 144 for horizon 140 and midpoint 150 for horizon 146 thereby drawing the fault cut line 152 in FIG. 26b;

(2) a first fault contact 156 will be added to the fault cut line 152, and a first extension 154 will be drawn between the edge "A" of horizon 140 and the first fault contact 156 on the fault cut line 152;

(3) a second fault contact 160 is added to the fault cut line 152, and a second extension 158 will be drawn between the edge "B" of horizon 140 and the second fault contact 160;

(4) a third fault contact 164 is added to the fault cut line 152, and a third extension 162 will be drawn between the edge "C" of horizon 146 and the third fault contact 164; and (5) a fourth fault contact 168 is added to the fault cut line 152, and a fourth extension 166 will be drawn between the edge "D" of horizon 146 and a fourth fault contact 168.

Fault Elements 90 data file—In accordance with the present invention, the "fault elements" 90 data file will now be created. The "fault elements" 90 data file of FIG. 8b will now include the following data: (1) in FIG. 26b, the fault cuts 152 drawn through each of the midpoints 144,. 150 of valid gaps 142,148 on horizons 140,146, and (2) the extensions 154,158,162,166 provided to the fault contacts 156, 160,164,168 on the fault cuts 152 in the manner discussed above with reference to FIGS. 26a and 26b.

The horizon time 40,92 of FIG. 10b was used to create the fault elements 90 data file, and the fault elements 90 data file clearly identifies all of the plurality of fault cuts in the set of seismic data of FIG. 10a.

However, the "output", in accordance with the present invention, is the drawing entitled "output fault elements" illustrated in FIGS. 24 and 25. The fault elements 90 data file produced the "output fault elements" shown in FIGS. 24 and 25, and the drawing entitled "output fault elements" of FIGS. 24 and 25 clearly identifies all the fault cuts in the set of seismic data of FIG. 10a.

In FIG. 8b, the fault elements 90 data file is then used to modify the horizon interpretation 42 of FIG. 8b, block 91, and it is provided as an input to the structural model, block 93.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for automatically determining one or more fault cuts in each of one or more horizons in a set of seismic data in response to one or more predetermined horizon time structures corresponding, respectively, to said one or more horizons, comprising the steps of:

(a) identifying one or more valid gaps in each of said one or more horizon time structures, each of said valid gaps having a length and a slope which is acceptable when compared to a reference length and a reference slope;

(b) locating a plurality midpoints in each of said valid gaps; and (c) drawing a fault cut at each of said midpoints of each of said valid gaps in each of said one or more horizon time structures, each of the fault cuts being located adjacent to an upper part of a particular one of said one or more horizons and adjacent to a lower part of said particular one of said one or more horizons in response to the drawing step (c).

2. The method of claim 1, wherein the drawing step (c) includes the step of drawing each of said fault cuts at an inclination angle which is equal to a predefined user input inclination angle.

3. The method of claim 1, further comprising:

(d) extending said upper part and said lower part of said particular one of said one or more horizons of the horizon time structure to each of the newly drawn fault cuts until a pair of fault contacts on said fault cuts are determined thereby automatically determining the plurality of fault cuts in each of said one or more horizons in the seismic data.

4. The method of claim 3, wherein the identifying step (a), of identifying valid gaps in each of the one or more horizon time structures, comprises the step of:

(a1) determining a horizon interpretation gap from each of the one or more horizon time structures.

5. The method of claim 4, wherein the identifying step (a), of identifying valid gaps in each of the one or more horizon time structures, further comprises the step of:

(a2) determining a set of connected bodies from the horizon interpretation gap, said set of connected bodies including a gap.

6. The method of claim 5, wherein the identifying step (a), of identifying valid gaps in each of the one or more horizon time structures, further comprises the step of:

(a3) determining a set of edited bodies representing edited versions of said set of connected bodies on the horizon time structure determined during step (a2), said set of edited bodies including a gap.

7. The method of claim 6, wherein the identifying step (a), of identifying valid gaps in each of the one or more horizon time structures, further comprises the step of:

(a4) providing one or more manually defined fault traces representing one or more gaps on the horizon time structure.

8. The method of claim 7, wherein the identifying step (a), of identifying valid gaps in each of the one or more horizon time structures, further comprises the steps of:

(a5) testing the gaps to determine if the gaps, in said set of connected bodies or in said edited bodies or in said fault traces, each have a length greater than or equal to a predetermined minimum length and a slope greater than or equal to a predetermined minimum slope, the gaps in said set of connected bodies or in said edited bodies or in said fault traces being said valid gaps when said gaps each have said length greater than or equal to said predetermined minimum length and said slope greater than or equal to said predetermined minimum slope.

9. The method of claim 3, wherein the locating step (b), of locating a plurality midpoints in each of said valid gaps, comprises the steps of:

(b1) locating said plurality of midpoints in each of said valid gaps;

(b2) generating a midpoint line drawn through said plurality of midpoints in each of said valid gaps; and (b3) creating a fault midpoints data file adapted for storing said plurality of midpoints for each of said valid gaps.

10. The method of claim 9, wherein the drawing step (c), of drawing fault cuts at each of said midpoints of each of said valid gaps in each of said one or more horizon time structures, comprises the steps of:

(c1) when said one or more horizons in said set of seismic data consists of a single horizon, defining an inclination angle;

(c2) drawing a fault cut through each of said midpoints of each of said valid gaps on said single horizon, said fault cut being drawn at a slope equal to said inclination angle defined during the defining step (c1).

11. The method of claim 10, wherein the extending step (d) further comprises the steps of:
- (d1) extending said upper part and said lower part of said single horizon of the horizon time structure to each of the fault cuts, drawn during the drawing step (c2), until a pair of fault contacts on each of said fault cuts are determined thereby automatically determining the plurality of fault cuts on said single horizon of the seismic data; and
- (d2) creating a fault elements data file adapted for storing information pertaining to said each of the plurality of fault cuts on said single horizon in the seismic data.

12. The method of claim 9, wherein the drawing step (c), of drawing fault cuts at each of said midpoints of each of said valid gaps in each of said one or more horizon time structures, comprises the steps of:
- (c1) when said one or more horizons in said set of seismic data includes at least a pair of horizons including at least a pair of gaps and at least a pair midpoints corresponding to said pair of gaps, manually associating at least one fault cut with said pair of midpoints of said pair of gaps of said pair of horizons, and manually drawing said at least one fault cut through said pair of midpoints of said pair of gaps;
- (c2) in response to the manually drawing step (c1), automatically drawing a plurality of additional fault cuts through other pairs of midpoints associated with other pairs of said valid gaps on said horizons, each of said additional fault cuts being drawn at a slope corresponding to the slope of said at least one fault cut drawn through said pair of midpoints following the manually associating step (c1).

13. The method of claim 12, wherein the extending step (d) further comprises the steps of:
- (d1) extending said upper part and said lower part of each of said horizons to each of the fault cuts, drawn during the drawing step (c2), until a pair of fault contacts on each of said fault cuts are determined thereby automatically determining the plurality of fault cuts in said horizons of the seismic data; and
- (d2) creating a fault elements data file adapted for storing information pertaining to said each of the plurality of fault cuts in said horizons of the seismic data.

14. An apparatus for automatically determining one or more fault cuts in each of one or more horizons in a set of seismic data in response to one or more predetermined horizon time structures corresponding, respectively, to said one or more horizons, comprising:
- first means for identifying one or more valid gaps in each of said one or more horizon time structures, each of said valid gaps having a length and a slope which is acceptable when compared to a reference length and a reference slope;
- second means for locating a plurality midpoints in each of said valid gaps; and
- third means for locating a fault cut at each of said midpoints of each of said valid gaps in each of said one or more horizon time structures, each of the fault cuts being located adjacent to an upper part of a particular one of said one or more horizons and adjacent to a lower part of said particular one of said one or more horizons.

15. The apparatus of claim 14, further comprising:
- fourth means for extending said upper part and said lower part of said particular one of said one or more horizons of the horizon time structure to each of the fault cuts until a pair of fault contacts on each of said fault cuts are produced thereby automatically determining the plurality of fault cuts in each of said one or more horizons in the seismic data.

16. The apparatus of claim 15, wherein said first means, for identifying one or more valid gaps in each of said one or more horizon time structures, comprises:
- horizon interpretation gap determination means for determining a horizon interpretation gap from each of the one or more horizon time structures.

17. The apparatus of claim 16, wherein said first means, for identifying one or more valid gaps in each of said one or more horizon time structures, further comprises:
- connected bodies determination means for determining a set of connected bodies from said horizon interpretation gap, said set of connected bodies including a gap.

18. The apparatus of claim 17, wherein said first means, for identifying one or more valid gaps in each of said one or more horizon time structures, further comprises:
- edited bodies determination means for determining a set of edited bodies representing edited versions of said set of connected bodies on the horizon time structure, said set of edited bodies including a gap.

19. The apparatus of claim 18, wherein said first means, for identifying one or more valid gaps in each of said one or more horizon time structures, further comprises:
- fault trace providing means for providing one or more manually defined fault traces representing one or more gaps on the horizon time structure.

20. The apparatus of claim 19, wherein said first means, for identifying one or more valid gaps in each of said one or more horizon time structures, further comprises
- testing means for testing the gaps to determine if the gaps, in said set of connected bodies or in said edited bodies or in said fault traces, each have a length greater than or equal to a predetermined minimum length and a slope greater than or equal to a predetermined minimum slope, the gaps in said set of connected bodies or in said set of edited bodies or in said fault traces being said valid gaps when said gaps have said length greater than or equal to said predetermined minimum length and said slope greater than or equal to said predetermined minimum slope.

21. The apparatus of claim 15, wherein said second means for locating a plurality midpoints in each of said valid gaps comprises:
- means for locating said plurality of midpoints in each of said valid gaps;
- means for generating a midpoint line drawn through said plurality of midpoints in each of said valid gaps; and
- means for creating a fault midpoints data file adapted for storing said plurality of midpoints for each of said valid gaps.

22. The apparatus of claim 21, wherein said third means, for locating a fault cut at each of said midpoints of each of said valid gaps, comprises:
- means for defining an inclination angle when said one or more horizons in said set of seismic data consists of a single horizon; and
- means for drawing a fault cut through each of said midpoints of each of said valid gaps on said single horizon, said fault cut being drawn at a slope equal to said inclination angle.

23. The apparatus of claim 22, wherein said fourth means comprises:

means for extending said upper part and said lower part of said single horizon of the horizon time structure to each of the fault cuts until a pair of fault contacts on each of said fault cuts are determined thereby automatically determining the plurality of fault cuts on said single horizon of the seismic data; and means for creating a fault elements data file adapted for storing information pertaining to said each of the plurality of fault cuts on said single horizon in the seismic data.

24. The apparatus of claim 21, wherein said third means, for locating a fault cut at each of said midpoints of each of said valid gaps, comprises:

associating means for manually associating at least one fault cut with a pair of midpoints of a pair of gaps of a pair of horizons, when said one or more horizons in said set of seismic data includes at least said pair of horizons including at least said pair of gaps and at least said pair midpoints corresponding to said pair of gaps, said associating means manually drawing said at least one fault cut through said pair of midpoints of said pair of gaps; and means for automatically drawing a plurality of additional fault cuts through other pairs of midpoints associated with other pairs of said valid gaps on said horizons, each of said additional fault cuts being drawn at a slope corresponding to the slope of said at least one fault cut manually drawn through said pair of midpoints of said pair of gaps.

25. The apparatus of claim 24, wherein said fourth means comprises:

means for extending said upper part and said lower part of each of said horizons to each of the fault cuts until a pair of fault contacts on each of said fault cuts are determined thereby automatically determining the plurality of fault cuts in said horizons of the seismic data; and means for creating a fault elements data file adapted for storing information pertaining to said each of the plurality of fault cuts in said horizons of the seismic data.

* * * * *